(12) United States Patent
Zhu et al.

(10) Patent No.: US 7,523,163 B2
(45) Date of Patent: *Apr. 21, 2009

(54) DISTRIBUTED NETWORK SYSTEM ARCHITECTURE FOR COLLABORATIVE COMPUTING

(75) Inventors: Min Zhu, Los Altos Hills, CA (US); Jian Shen, Santa Clara, CA (US); Steven Li, San Jose, CA (US); Guanghong Yang, Mountain View, CA (US); Bin Zhao, San Jose, CA (US); Shi Yan, Fremont, CA (US); Zheng Yuan, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/480,659

(22) Filed: Jul. 3, 2006

(65) Prior Publication Data
US 2006/0248144 A1 Nov. 2, 2006

Related U.S. Application Data

(63) Continuation of application No. 09/751,424, filed on Dec. 29, 2000, now Pat. No. 7,130,883.

(51) Int. Cl.
*G06F 13/00* (2006.01)
(52) U.S. Cl. .............. 709/204; 709/205; 715/753; 714/4
(58) Field of Classification Search .......... 709/204, 709/205, 203; 715/751–759; 370/260; 714/4, 714/10–13
See application file for complete search history.

(56) References Cited

U.S. PATENT DOCUMENTS

| | | | |
|---|---|---|---|
| 4,654,484 A | 3/1987 | Reiffel et al. |
| 5,176,520 A | 1/1993 | Hamilton |
| 5,293,619 A | 3/1994 | Dean |
| 5,434,852 A | 7/1995 | LaPorta et al. |
| 5,526,492 A | 6/1996 | Ishida |
| 5,557,798 A | 9/1996 | Skeen et al. |

(Continued)

OTHER PUBLICATIONS

Derfler, et al., "How Networks Work," Cue Corporation, Millennium Edition, Sep. 2000, pp. 205-209.

(Continued)

*Primary Examiner*—Kenneth R Coulter
(74) *Attorney, Agent, or Firm*—Cesari and McKenna LLP

(57) ABSTRACT

A distributed collaborative computer system is provided that comprises a plurality of server computers interconnected via a high-speed link. Client computers can connect to any available server computer and start or join a conference hosted on either the server computer to which the client computer is connected or any other server in the system. As a result, the system and method of the present invention is easily scalable to support an arbitrary number of participants to a conference by merely adding the appropriate number of server computers to the system. In addition, by replicating the conference information on more than one server computer, the single point of failure limitation is eliminated. In fact, if a server hosting or participating in a conference malfunctions, the failure is detected by other server computers and the client computer is able to reconnect to the conference through a new server computer.

23 Claims, 27 Drawing Sheets

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,623,603 A | 4/1997 | Jiang et al. | |
| 5,649,104 A | 7/1997 | Carleton et al. | |
| 5,696,895 A | 12/1997 | Hemphill et al. | |
| 5,761,419 A | 6/1998 | Schwartz et al. | |
| 5,764,901 A | 6/1998 | Skarbo et al. | |
| 5,764,916 A | 6/1998 | Busey et al. | |
| 5,781,727 A | 7/1998 | Carleton et al. | |
| 5,805,804 A | 9/1998 | Laursen et al. | |
| 5,805,846 A | 9/1998 | Nakajima et al. | |
| 5,829,001 A | 10/1998 | Li et al. | |
| 5,841,980 A | 11/1998 | Waters et al. | |
| 5,872,923 A | 2/1999 | Schwartz et al. | |
| 5,884,039 A | 3/1999 | Ludwig et al. | |
| 5,887,170 A | 3/1999 | Ansberry et al. | |
| 5,892,509 A | 4/1999 | Jakobs et al. | |
| 5,892,946 A | 4/1999 | Woster et al. | |
| 5,907,324 A | 5/1999 | Larson et al. | |
| 5,916,302 A | 6/1999 | Dunn et al. | |
| 5,918,239 A | 6/1999 | Allen et al. | |
| 5,923,844 A | 7/1999 | Pommier et al. | |
| 5,940,082 A | 8/1999 | Brinegar et al. | |
| 5,944,785 A | 8/1999 | Pommier et al. | |
| 5,944,791 A | 8/1999 | Scherpbier | |
| 5,948,022 A | 9/1999 | Carleton et al. | |
| 5,974,446 A | 10/1999 | Sonnenreich | |
| 5,983,263 A | 11/1999 | Rothrock et al. | |
| 5,996,002 A | 11/1999 | Katsurabayahi et al. | |
| 6,038,593 A | 3/2000 | Huckins | |
| 6,047,314 A | 4/2000 | Pommier et al. | |
| 6,055,574 A | 4/2000 | Smorodinsky et al. | |
| 6,058,416 A | 5/2000 | Mukherjee et al. | |
| 6,058,490 A | 5/2000 | Allen et al. | |
| 6,061,717 A | 5/2000 | Carleton et al. | |
| 6,167,432 A | 12/2000 | Jiang | |
| 6,173,311 B1 | 1/2001 | Hassett et al. | |
| 6,178,441 B1 | 1/2001 | Elnozahy | |
| 6,182,085 B1 | 1/2001 | Eichstaedt et al. | |
| 6,185,695 B1 | 2/2001 | Murphy et al. | |
| 6,192,394 B1 | 2/2001 | Gutfreund et al. | |
| 6,195,685 B1 | 2/2001 | Mukherjee et al. | |
| 6,233,565 B1 | 5/2001 | Lewis et al. | |
| 6,246,444 B1 | 6/2001 | Kim | |
| 6,247,141 B1 | 6/2001 | Holmberg | |
| 6,263,433 B1 | 7/2001 | Robinson et al. | |
| 6,275,953 B1 | 8/2001 | Vahalia et al. | |
| 6,289,385 B1 | 9/2001 | Whipple et al. | |
| 6,292,204 B1 | 9/2001 | Carleton et al. | |
| 6,308,887 B1 | 10/2001 | Korman et al. | |
| 6,314,425 B1 | 11/2001 | Serbinis et al. | |
| 6,314,555 B1 | 11/2001 | Ndumu et al. | |
| 6,321,252 B1 | 11/2001 | Bhola et al. | |
| 6,343,313 B1 | 1/2002 | Salesky et al. | |
| 6,349,327 B1 | 2/2002 | Tang et al. | |
| 6,381,637 B1 | 4/2002 | Kamada | |
| 6,397,191 B1 | 5/2002 | Notani et al. | |
| 6,411,989 B1 | 6/2002 | Anupam et al. | |
| 6,411,991 B1 | 6/2002 | Helmer et al. | |
| 6,412,079 B1 | 6/2002 | Edmonds | |
| 6,463,460 B1 | 10/2002 | Simonoff | |
| 6,487,585 B1 | 11/2002 | Yurkovic | |
| 6,499,026 B1 | 12/2002 | Rivette et al. | |
| 6,539,406 B1 | 3/2003 | Ibarra et al. | |
| 6,567,813 B1 | 5/2003 | Zhu et al. | |
| 6,570,590 B1 | 5/2003 | Dubrow et al. | |
| 6,574,674 B1 | 6/2003 | May et al. | |
| 6,584,466 B1 | 6/2003 | Serbinis et al. | |
| 6,584,493 B1 | 6/2003 | Butler | |
| 6,594,799 B1 | 7/2003 | Robertson et al. | |
| 6,601,087 B1 | 7/2003 | Zhu et al. | |
| 6,606,660 B1 | 8/2003 | Bowman-Amuah | |
| 6,611,586 B2 | 8/2003 | Ibezim et al. | |
| 6,611,822 B1 | 8/2003 | Beams et al. | |
| 6,654,032 B1 | 11/2003 | Zhu et al. | |
| 6,687,846 B1 | 2/2004 | Adrangi et al. | |
| 6,715,100 B1 | 3/2004 | Hwang | |
| 6,731,625 B1 | 5/2004 | Eastep et al. | |
| 6,742,015 B1 | 5/2004 | Bowman-Amuah | |
| 6,748,420 B1 | 6/2004 | Quatrano et al. | |
| 7,069,298 B2 * | 6/2006 | Zhu et al. | 709/204 |
| 7,130,883 B2 * | 10/2006 | Zhu et al. | 709/204 |
| 7,203,755 B2 * | 4/2007 | Zhu et al. | 709/227 |
| 2001/0009014 A1 | 7/2001 | Savage et al. | |
| 2001/0054070 A1 | 12/2001 | Savage et al. | |
| 2002/0010741 A1 | 1/2002 | Stewart et al. | |
| 2002/0065912 A1 | 5/2002 | Catchpole et al. | |
| 2002/0150094 A1 | 10/2002 | Cheng et al. | |
| 2003/0159084 A1 | 8/2003 | Murphy et al. | |
| 2003/0167293 A1 | 9/2003 | Zhu et al. | |
| 2003/0167304 A1 | 9/2003 | Zhu et al. | |
| 2003/0167418 A1 | 9/2003 | Zhu et al. | |
| 2003/0208537 A1 | 11/2003 | Lane et al. | |
| 2004/0080504 A1 | 4/2004 | Salesky et al. | |

OTHER PUBLICATIONS

Boyd, Lane, "Taking Collaboration Into Orbit," Computer Graphics World, Sep. 1998.

Caton, Michael, PC Week, "Easy Access, Low Cost Make Collaboration a Good Outsourced Fit," Feb. 28, 2000.

Downs, Scott, et al., "The Net as a Vehicle for Business Data Sharing," Open Systems Today, Apr. 25, 1994.

Gall, Ulrich; et al. "Promondia: A Java-Based Framework for Real-Time Group Communication in the Web," Apr. 7-11, 1997, Internet Publication.

Ly, Eric, "Distributed Java Applets for Project Management on the Web," May/Jun. 1997, IEEE Internet Computing Online, vol. 1. No. 3, Internet Publication.

Mates, Nathan, et al., "The Web Meets MOOs, IRC and the MBone," Jun. 8, 1995, Internet Publication.

Meyer, Tom, et al., "A MOO-Based Collaborative Hypermedia System for WWW," Internet Publication.

Novitski, B.J., "Team Building," Computer Graphics World, Apr. 1, 2000.

Roberts-Witt, Sarah L., "Online Collaboration Tools Maker Targets a Maturing Market," Internet World, Jun. 15, 2000.

Selvaratnam, Nirooban, "Overview of Programming Languages and Support Tools for Distributed Programming," Internet Publication.

* cited by examiner

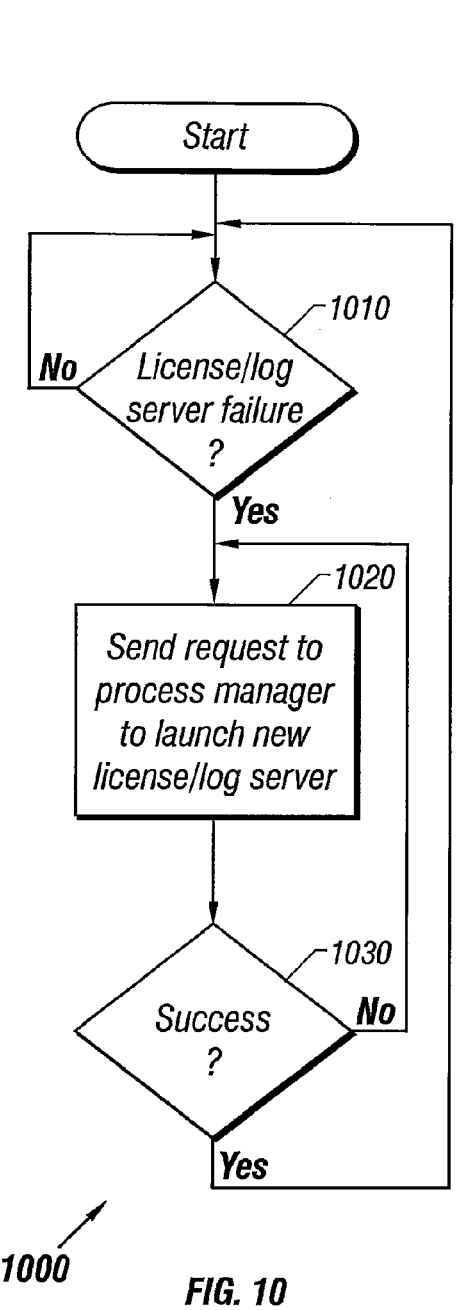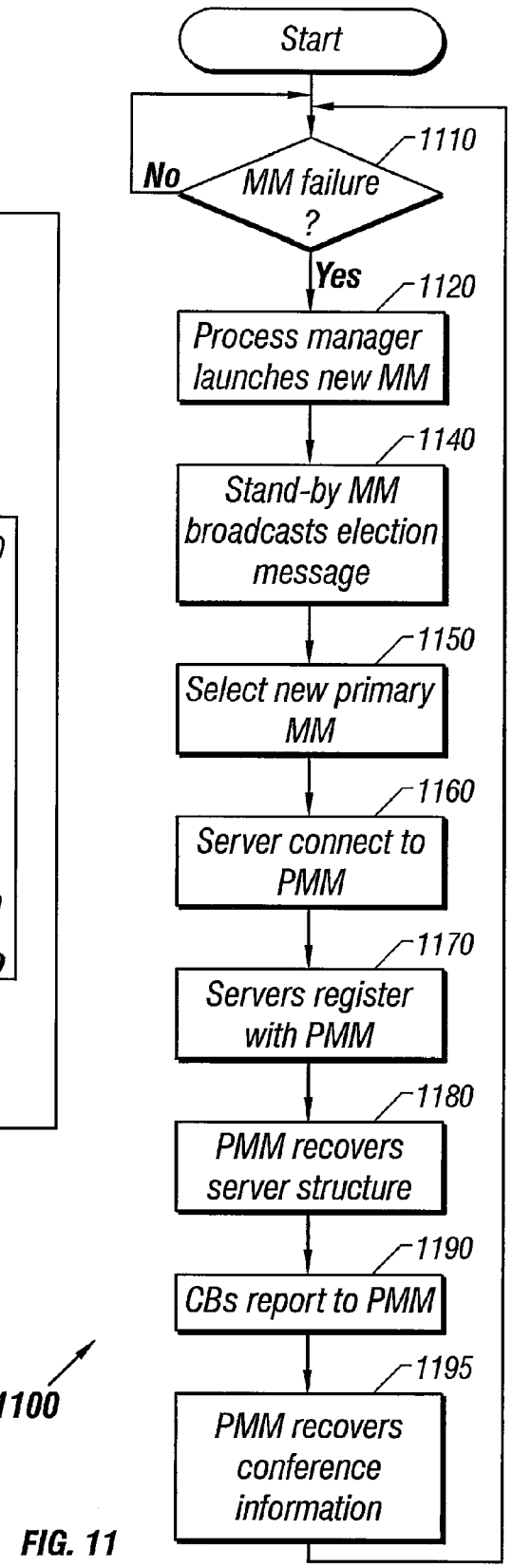
FIG. 10
FIG. 11

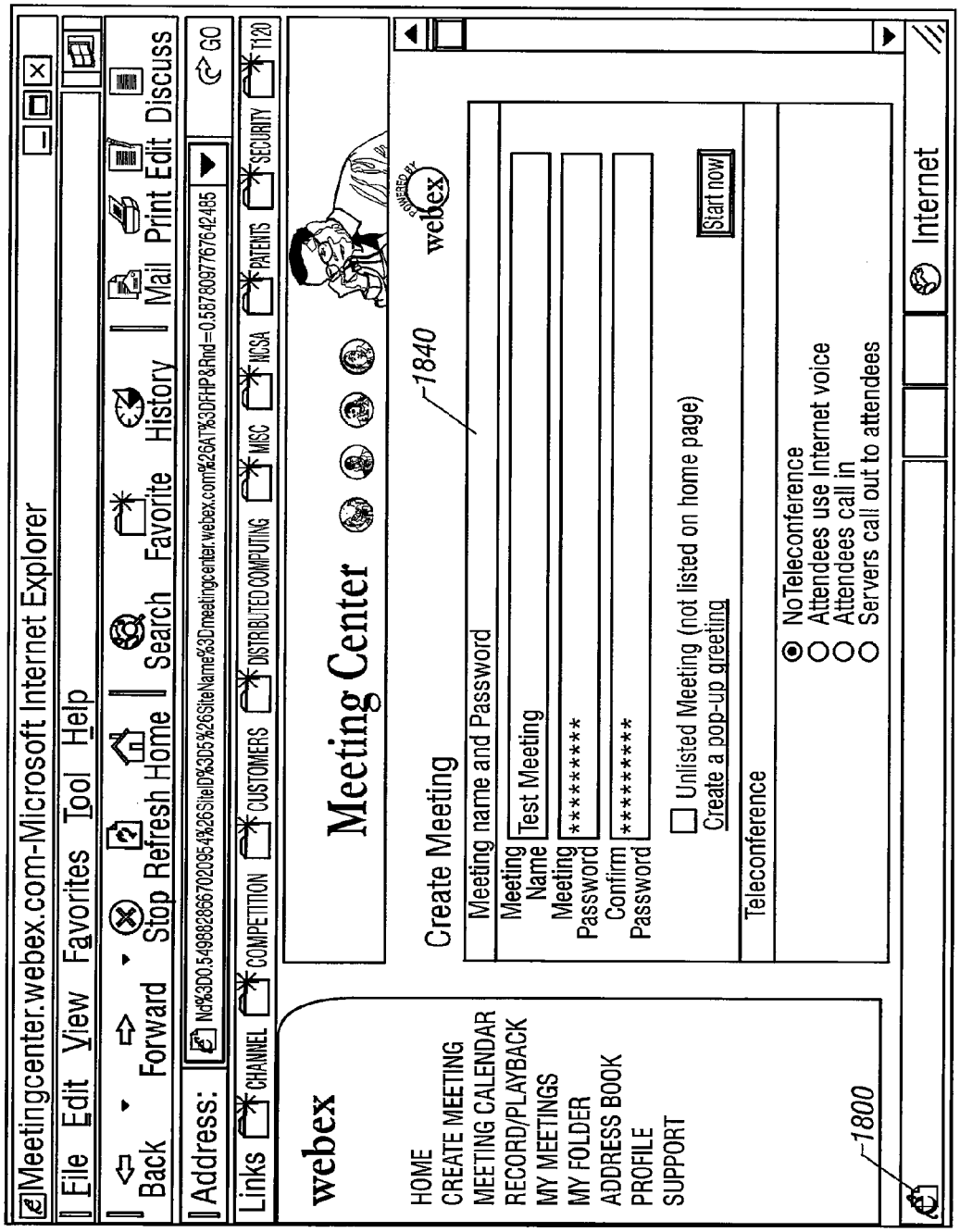
FIG. 18C1

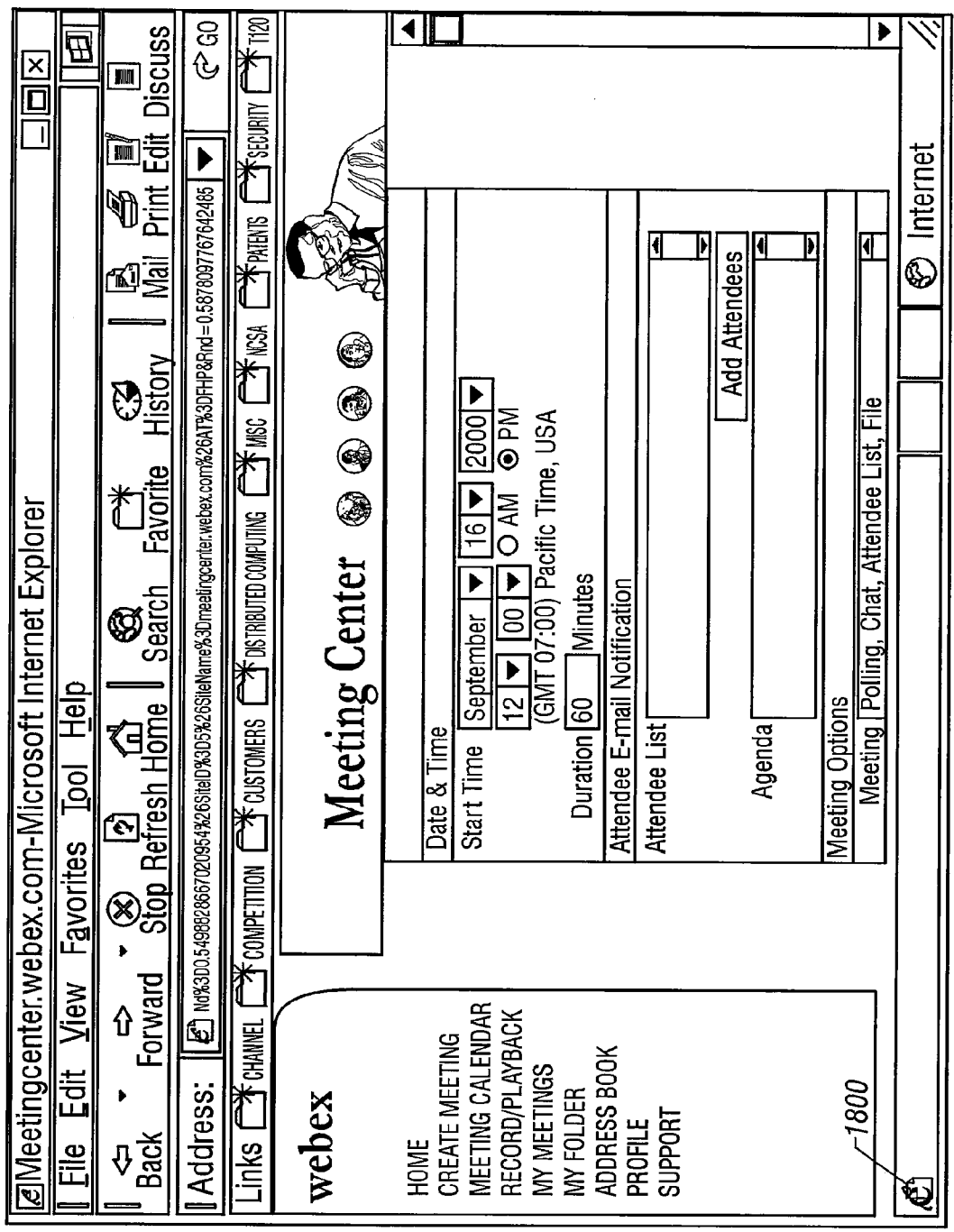
FIG. 18C2

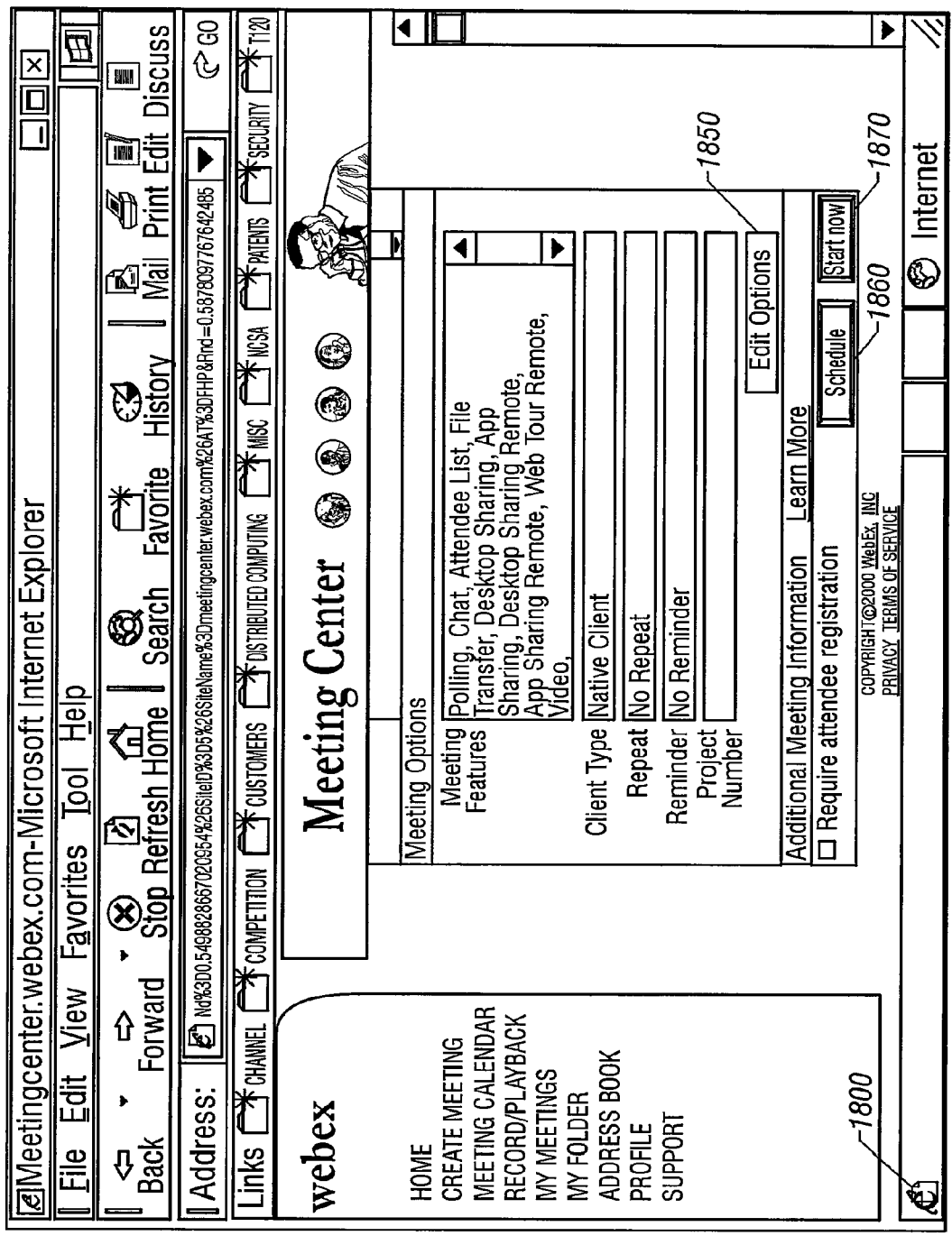
FIG. 18C3

FIG. 19B

DISTRIBUTED NETWORK SYSTEM ARCHITECTURE FOR COLLABORATIVE COMPUTING

RELATED APPLICATION

This application is a continuation of application Ser. No. 09/751,424, now U.S. Pat. No. 7,130,883, which was filed on Dec. 29, 2000, all of which are expressly incorporated herein by reference.

CROSS-REFERENCE TO CD-ROM APPENDIX

An Appendix containing a computer program listing is submitted on a compact disk, which is herein incorporated by reference in its entirety. The total number of compact discs including duplicates is two. Appendix A, which is part of the present specification, contains a list of the files contained on the compact disk. These listings contain material which is subject to copyright protection. The copyright owner has no objection to the facsimile reproduction by anyone of the patent document or the patent disclosure, as it appears in the patent and trademark office patent file or records, but otherwise reserves all copyright rights whatsoever.

BACKGROUND OF THE INVENTION

1. Field of the Invention

The present invention relates generally to computer networks and, more particularly, to collaborative computing over a computer network.

2. Description of the Related Art

Traditional collaborative computing tools allow computer users at different locations to communicate via a computer network and share documents or applications stored and/or executed on one the user's computers. While both peer-to-peer and client-server communication models have been used in the past, web-based collaborative tools generally employ a client-server model.

For example, client-server application sharing (also discussed in the context of "distributed computing") is described in U.S. Pat. No. 5,434,852 "Distributed Processing Architecture for Control of Broadband and Narrowband Communication Networks;" U.S. Pat. No. 5,887,170 "System for Classifying and Sending Selective Requests . . . ;" and U.S. Pat. No. 6,038,593 "Remote Application Control for Low Bandwidth Application Sharing," all incorporated herein by reference in their entireties. Other group communication techniques are described by Ulrick Hall and Franz J. Hauck, "Promondia: A Java-Based Framework for Real-time Group Communication in the Web," Proceedings of Sixth International World Wide Web Conference (Apr. 7-11, 1997); Lane Boyd, "Taking Collaboration Into Orbit," Computer Graphics World, Vol. 21, No. 9, p. 36 (September 1998); and Eric Ly, "Distributed Java Applets for Project Management on the Web," IEEE Internet Computing Online, Vol. 1, No. 3 (May/June 1997), all incorporated herein by reference in their entireties.

International Telecommunications Union (ITU) Standard T.120 is a family of open standards that provides both communications and applications protocols to support real-time multipoint data communications for collaboration and conferencing, among other uses. This standard is outlined in A Primer on the T.120 Series Standard by DataBeam Corp. (May 14, 1997), incorporated herein by reference in its entirety.

FIG. 1A is a block diagram illustrating the communication scheme used for an exemplary traditional collaborative computer system 100. In FIG. 1A, client computers 110$n$ (where n=A, B, C . . . ) can connect to server computers 120$n$ over a global-area computer network 130 (e.g., the Internet). As used herein, the numeral n appended to a reference number does not imply any correspondence among elements having different numerals (e.g., client computer 110A bears no relationship to server computer 120A). FIG. 1B is a block diagram illustrating the actual communications channels established between client computers 110$n$ and server computers 120$n$ to set up two conferences between users of client computers 110A and 110B on the one end and 110C and 110D on the other. As is readily apparent from inspection of FIG. 1B, each conference is handled by a single server computer 120$n$. This model performs satisfactorily for conferences having a small number of participants and conferences that do not require fault tolerance. However, as the number of participants in a conference increases, the computing power of server computer 120$n$ becomes a bottleneck. Furthermore, if the particular server computer 120$n$ that is handling a conference malfunctions, the entire conference is disrupted (i.e., server computer 120$n$ represents a single point of failure for the entire system handling that conference). Accordingly, there is a need for an improved collaborative computing system

BRIEF SUMMARY OF THE INVENTION

The system and method of the present invention provide a distributed collaborative computer system that is scalable to handle an arbitrary number of conference participants and eliminates the server as the single point of failure in the system. This is accomplished by providing a plurality of server computers interconnected via one or more high-speed links. Client computers can connect to any available server computer and start or join a conference hosted on either the server computer to which the client computer is connected or any other server in the system. As a result, the system and method of the present invention is easily scalable to support an arbitrary number of participants to a conference by merely adding the appropriate number of server computers to the system. In addition, by replicating the conference information on more than one server computer, the system and method of the present invention eliminate the single point of failure limitation of prior art systems. In fact, if a server hosting or participating in a conference malfunctions, the failure is detected by other server computers and the client computer is able to reconnect to the conference through a new server computer.

BRIEF DESCRIPTION OF THE DRAWINGS

The present disclosure may be better understood and its numerous features and advantages made apparent to those skilled in the art by referencing the accompanying drawings.

FIGS. 8, 9, 10, and 11 are flow diagrams illustrating the operation of the meeting manager of FIG. 3.

FIGS. 18A, 18B, 18C1-3, 19A, 19B, 20A, 20B and 20C are views of web pages displayed by client browser of FIG. 3 during operation of the distributed collaborative computer system of FIG. 3.

The use of the same reference symbols in different drawings indicates similar or identical items.

DETAILED DESCRIPTION OF THE INVENTION

Figure 1A:
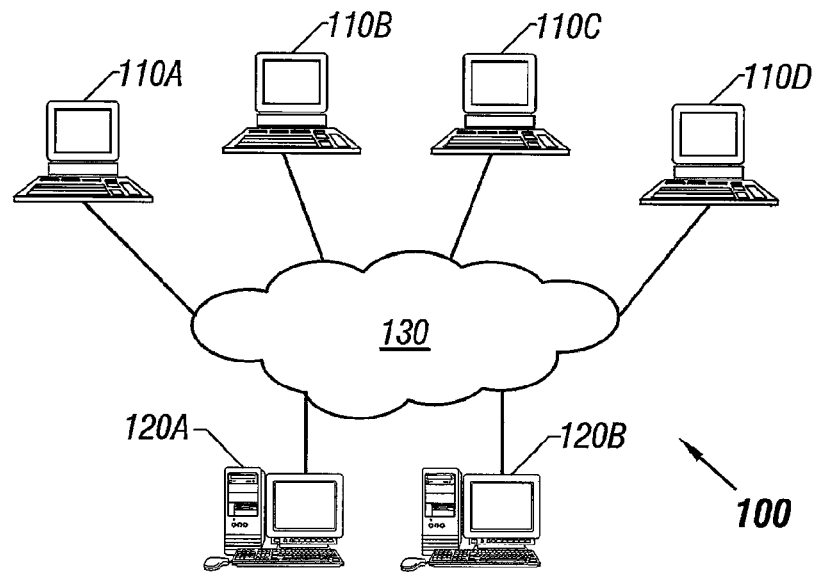
FIG. 1A is a block diagram of a prior art collaborative computer system.
Figure 1B:
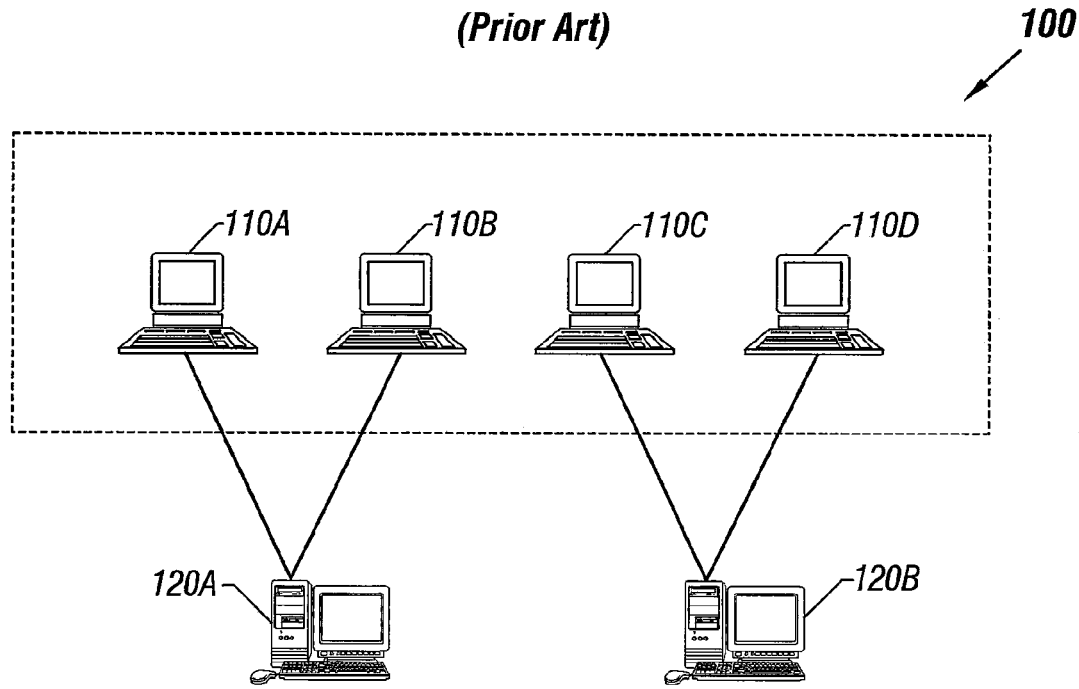
FIG. 1B is a block diagram illustrating the connections established between the client and server computer of FIG. 1A during two conferences.
Figure 2A:
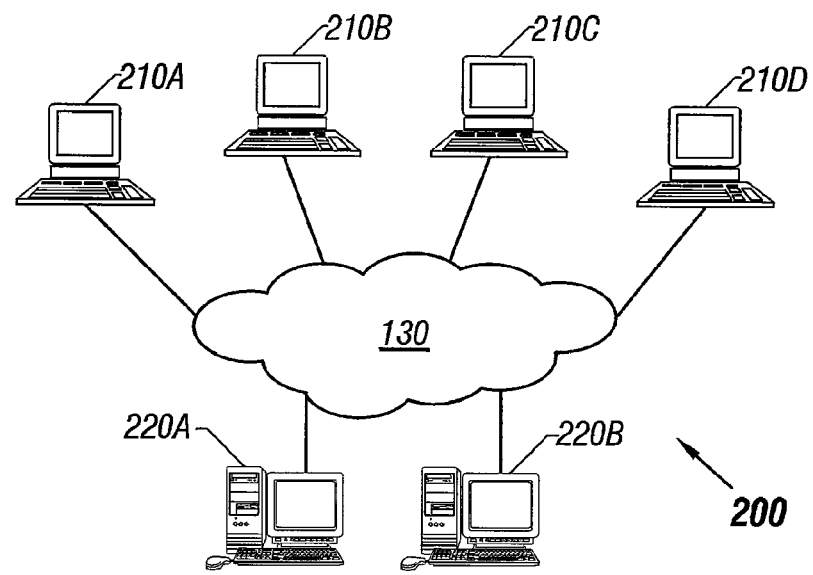
FIG. 2A is a block diagram of a distributed collaborative computer systems, in accordance with some embodiments of the invention.

FIG. 2A illustrates a distributed collaborative computing system 200, in accordance to some embodiments of the invention. Client computers 210$n$ (where n=A, B, C . . . ) are connected to server computers 220$n$ via global-area computer network 130. Unlike in the prior art system of FIGS. 1A and 1B, each client computer 210$n$ can connect to any server computer 220$n$. Server computers 220$n$ are in turn connected through a high-speed link 230. High speed link 230 allows faster throughput and a higher level of security than global-area network 130. For example, in some embodiments high-speed link 130 is a dedicated T1 or T3 or optical carrier-class link, such as one employing the well-known SONET standard and OC-48 or OC-192 framing. One of ordinary skill in the art will readily recognize that many other equivalent high-speed network standards, including non-optical standards, may be employed to create a high bandwidth link.

Figure 2B:
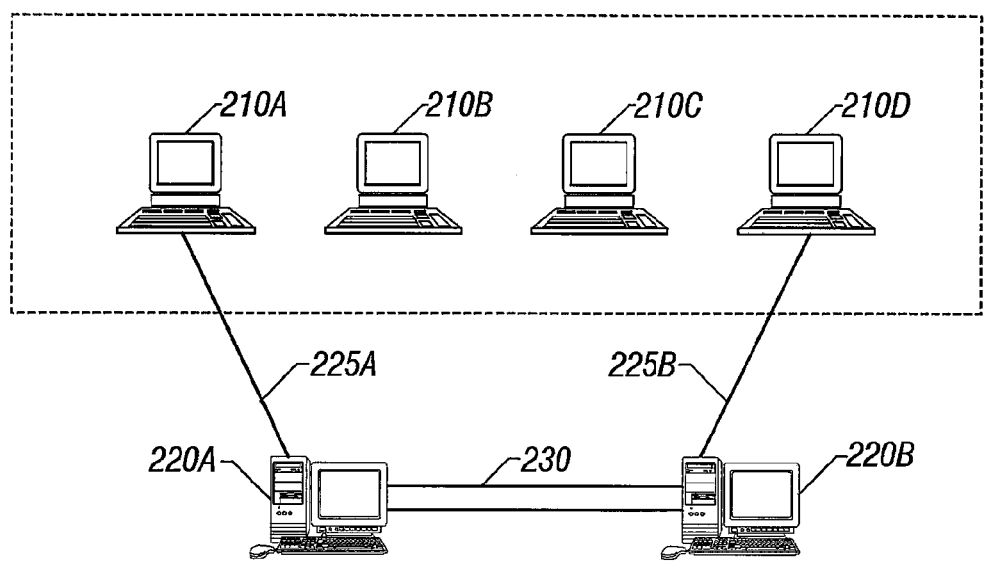
FIG. 2B is a block diagram illustrating the connections established between the client and server computers of FIG. 2A during a conference.

FIG. 2B illustrates the connections established between client computers 210$n$ and server computers 220$n$ to conduct a conference between participants seated at client computers 210A and 210D, respectively. First, client computer 210A (whose user will host the conference) establishes a connection 225A to server computer 220A over global-area network 130. Server computer 220A, in turn, is connected to server computer 220B via high-speed link 230. Finally, client computer 210D, whose user will join the conference hosted by the user of client computer 210A, establishes a connection 225B to server computer 220B over global-area network 130. As a result, information transmitted from client computer 210A travels through connection 225A, high-speed link 230 and connection 225B to reach client computer 210D. Similarly, information transmitted from client computer 210D travels through connection 225B, high-speed link 230 and connection 225A to reach client computer 210A. Since high-speed link 230 is several orders of magnitude faster than connections 225A and 225B, the delay introduced by high-speed link 230 is transparent to the users of client computers 210A and 210B.

Figure 3:
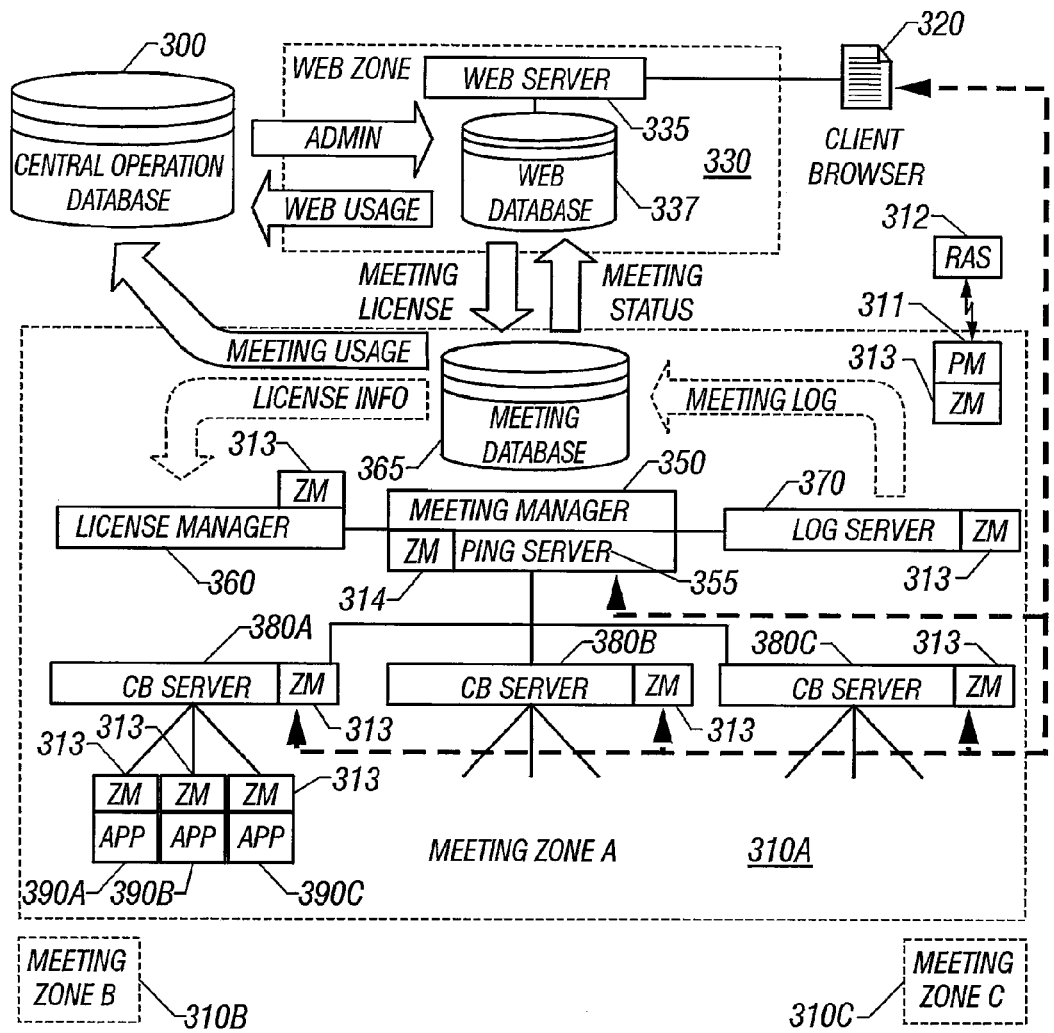
FIG. 3 is a block diagram of the software components of a distributed collaborative computer system, in accordance with some embodiments of the invention.

FIG. 3 is a block diagram of the software components of a distributed collaborative computer system 300, in accordance with some embodiments of the invention.

Distributed collaborative computer system 300 includes meeting zones 310$n$ (where n=A, B, C), client browser 320, web zone 330 and central operation database 350. Client browser 320 is a web browser program executed on one of client computers 210$n$ (FIGS. 2A and 2B). Client browser 320 first connects to web zone 330 to request starting or joining a conference. Web zone 330, in turn, verifies the user and conference information and updates central operation database 340 accordingly. Once web zone 330 has verified that the user is authorized to start/join a conference, client browser 320 connects to one of meeting zones 310$n$ to access the conference. Meeting zone 310$n$, in turn, connects client browser 320 to the desired conference and updates central operation database 340 accordingly.

Web zone 330 includes a web server 335 that maintains a website to allow users to access distributed collaborative computer system 300 and a web database 337 that stores web usage and administrative information about users of distributed collaborative computer system 300. The information stored in web database 337 is periodically synchronized and/or replicated with the information stored in central operation database 340 to ensure data consistency.

Each meeting zone 310$n$, in turn, includes a meeting manager 350, a ping server 355, a license manager 360, a meeting database 365, a log server 370, collaboration (CB) servers 380$n$, and application (App) servers 390$n$. Furthermore, each meeting zone 310$n$ also includes a process manager (PM) 311. Process manager 311 is the controlling process for all logical servers running on a physical server within the meeting zone. PM 311 thus monitors the health of all logical servers and processes running on the physical server and spawns replacement processes on failure. Alternatively, PM 311 can start new processes on command from remote access service (RAS) 312.

In one embodiment of the present invention, a single instance of meeting zone 310A is implemented on one physical server (i.e., one machine).

In some embodiments, each meeting zone is implemented on a single physical server. One of ordinary skill will readily appreciate, however, that multiple physical servers could also be used either as hot or warm standby units for redundancy or to spread the logical server loading across multiple machines, each with its own PM. Alternatively, several meeting zones could be implemented on one physical server, either having their own PM, or sharing a single PM.

PM 311 spawns each logical server (e.g., CB servers 380A, 380B, 380C; App server 390A, 390B, 390C; meeting manager 350, ping server 35, log server 370, and license manager 360) as directed by a startup configuration file or operator command through RAS 312. RAS 312 is, in some embodiments, a real-time messaging service such as TIBCO Rendezvous, available from TIBCO Software, Inc. of Palo Alto, Calif.

Each logical server has its own communications and control module known as a zone manager (ZM). Conceptually, each ZM 313 is functionally similar although one of ordinary skill in the art will appreciate that implementation optimizations may allow for reduced functionality in some instances of ZM 313.

Meeting manager 350 also possesses a special zone manager 314, so designated because it also acts as a gatekeeper (GK) for the entity meeting zone 310. The GK maintains a subset of the state of each logical server so that meeting manager 350 has immediately available the detailed status of the entire meeting zone 310.

Each ZM, which is spawned (created) in direct correspondence to each logical server or autonomous process on a given physical server machine, monitors the health and status of its corresponding logical server or process. All logical server communications with other logical servers and with the process manager 211 go through the ZM in each logical server and the PM.

The operational functions of PM 311, RAS 312, ZM 313, and ZM/GK 314 are discussed in further detail below.

All ZMs report to a single "super ZM", known as the gatekeeper or ZM/GK. Each ZM sends a subset of its corresponding logical server's state and traffic capacity to the ZM/GK so that the GK is aware of the status of all elements of the meeting zone. This enables the meeting manager to get coordinated zone state reports and therefore "know" the status of the entire meeting zone.

Zone status is important to the meeting manager (and thus to the overall health and efficiency of the zone) because the meeting manager uses ZM/GK state reports to manage both the zone's overall quality of service (QoS) and the load balance across all active collaboration servers (CBs) in the zone.

QoS, in this context, refers to the zone's ability to respond to client data requests of all types (e.g., HTTP, application sharing, document sharing, telephony, and so forth). In addition, QoS is an indirect indicator of latency to those requests, caused by high and possibly unbalanced loading of the logical servers in the meeting zone. For example, in some embodiments of the present invention, a meeting manager faced with a need to add more user participants to an in-progress meeting must determine if an additional CB server must be spawned (i.e., brought on-line) to keep overall CB server loading below a certain threshold. This "intelligence" in the MM is implemented through the ZMs in each CB and the coordinating function of the ZM/GK reporting to the MM. The MM can thus decide if the pre-defined QoS for the specific user client (perhaps determined by the time of day, the user's license, or the type of service purchased by the user or some communication thereof, to name but a few examples), would be unobtainable without additional CB server resources. If so, the meeting manager will request that the process manager spawn a new CB server.

Once client browser 320 has received authorization to start/join a conference, client browser 320 attempts to connect to ping servers 355 in multiple meeting zones 310n. Client browser 320 selects the first ping server to respond to the connection request and disconnects other responding ping servers 355. The selected ping server, in turn, forwards the request to start/join a conference to a meeting manager 350 in the same meeting zone 310n as the selected ping server 355. Meeting manager 350, in turn, assigns a CB server 380n to host/handle the conference. The selected CB server 380n connects to client browser 320 and any other CB servers 380n handling the conference that the user wishes to start/join. Thus, client browser 320 communicates with other client browsers 320 via the selected CB server 380n.

App servers 390n are used by CB servers 380n and client browsers 320 to support services such as document view, file sharing, video, voice over IP, telephony, polling, chat and application sharing. Collaborative support for these services are further described in the following references, each incorporated herein by reference in its entirety:

["Instant Document Sharing," co-pending and commonly-assigned Application for a U.S. patent Ser. No. 09/442,424, filed Nov. 17, 1999, now U.S. Pat. No. 6,601,087.

"Instant Sharing of Documents in a Remote Server," co-pending and commonly-assigned Application for U.S. patent Ser. No. 09/471,938, filed Dec. 23, 1999, now U.S. Pat. No. 6,654,032.

"Remote Document Serving," co-pending and commonly-assigned Application for a U.S. patent Ser. No. 09/591,377, filed Jun. 9, 2000, now U.S. Pat. No. 6,763,501.

"Instantaneous Remote Control of an Unattended Server," co-pending and commonly-assigned Application for a U.S. patent Ser. No. 09/515,684, files Feb. 29, 2000, now U.S. Pat. No. 6,691,154.

"Method for Creating Peer-to-Peer Connections Over an Interconnected Network to Facilitate Conferencing Among Users," co-pending and commonly-assigned Application for a U.S. patent Ser. No. 08/609,025, filed on Feb. 29, 1996, now U.S. Pat. No. 6,167,432.

"Method for Establishing a Communication Connection Between Two or More Users Via a Network of Interconnected Computers," co-pending and commonly-assigned Application for a U.S. patent Ser. No. 09/195,801, filed on May 12, 2000, now abandoned.

"Emulating a Persistent Connection Using HTTP," co-pending and commonly-assigned Application for a U.S. patent Ser. No. 09/449,011, filed on Nov. 24, 1999 now U.S. Pat. No. 6,789,119.

"Method of Transferring Data at Adjustable Levels of Priorities to Provide Optimum Response to User Demands," U.S. Pat. No. 5,623,603.

"Method to Provide for Virtual Screen Overlay," U.S. Pat. No. 5,577,188.

"Collaborative Web Browser," U.S. Pat. No. 5,944,791.

Log server 370 communicates with meeting manager 350 via their respective ZMs 313 and 314 and stores information related to new users joining/leaving conferences and updates meeting database 365. License manager 360 communicates with meeting manager 350 (again, through ZMs 313 and 314) and polls meeting database 360 to ensure that the number of users authorized to join a meeting is not exceed.

Overall fault tolerance is ensured by providing process-level fault monitoring by the ZM and correction (e.g., process replacement) by the PM. At the logical server level, the MM uses ZM/GK state monitoring to detect logical server faults and PM commands to spawn replacements. Logical server state replication is also provided by the gatekeeper, using the meeting database. Finally, physical server fault tolerance is provided by operator hardware and environmental status using a combination of manual and RAS monitoring and control methods well-known in the art.

Figure 4A:
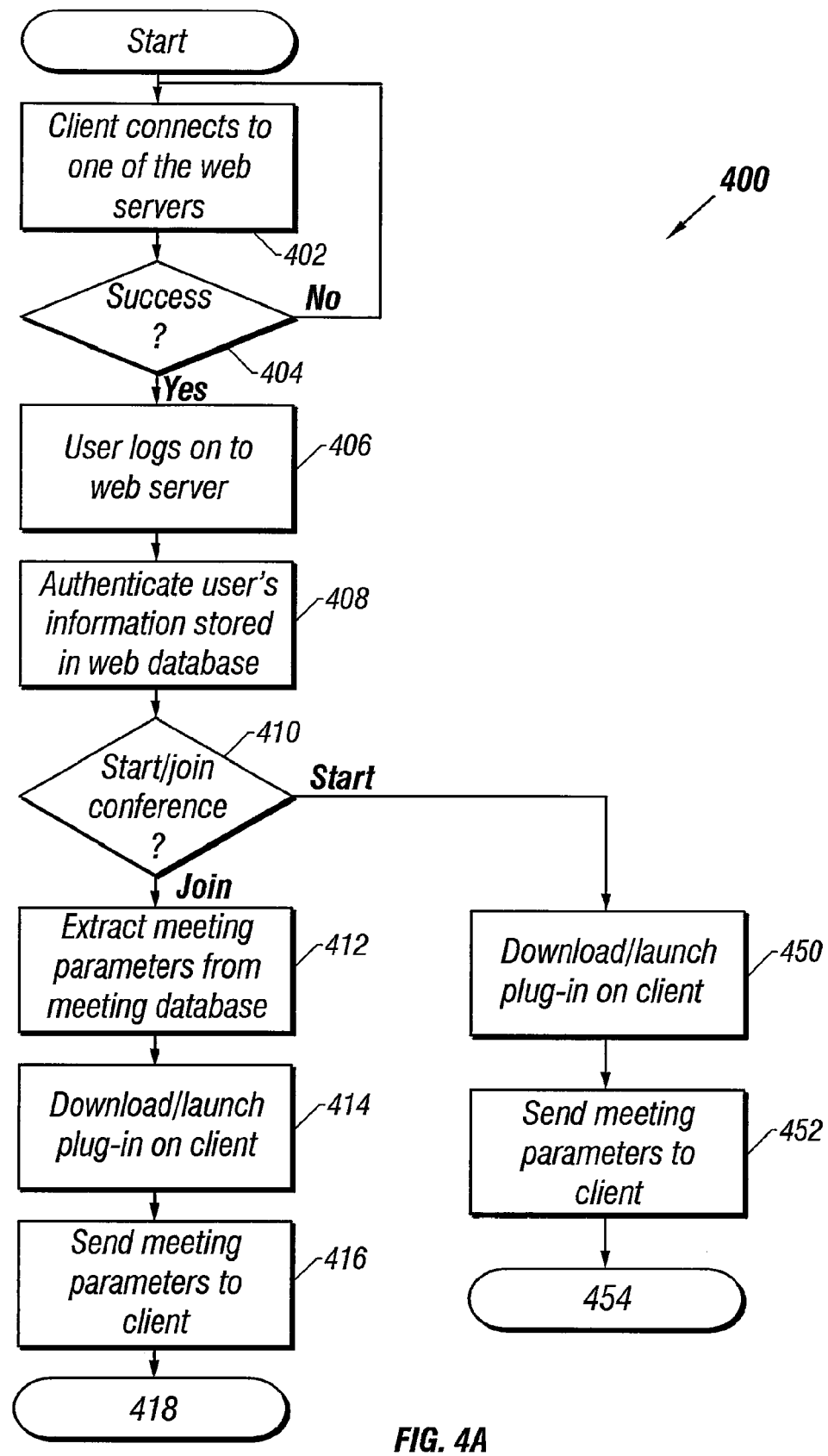
FIGS. 4A, 4B, and 4C are flow diagrams illustrating a start/join conference operation on the distributed collaborative computer system of FIG. 3.
Figure 4B:
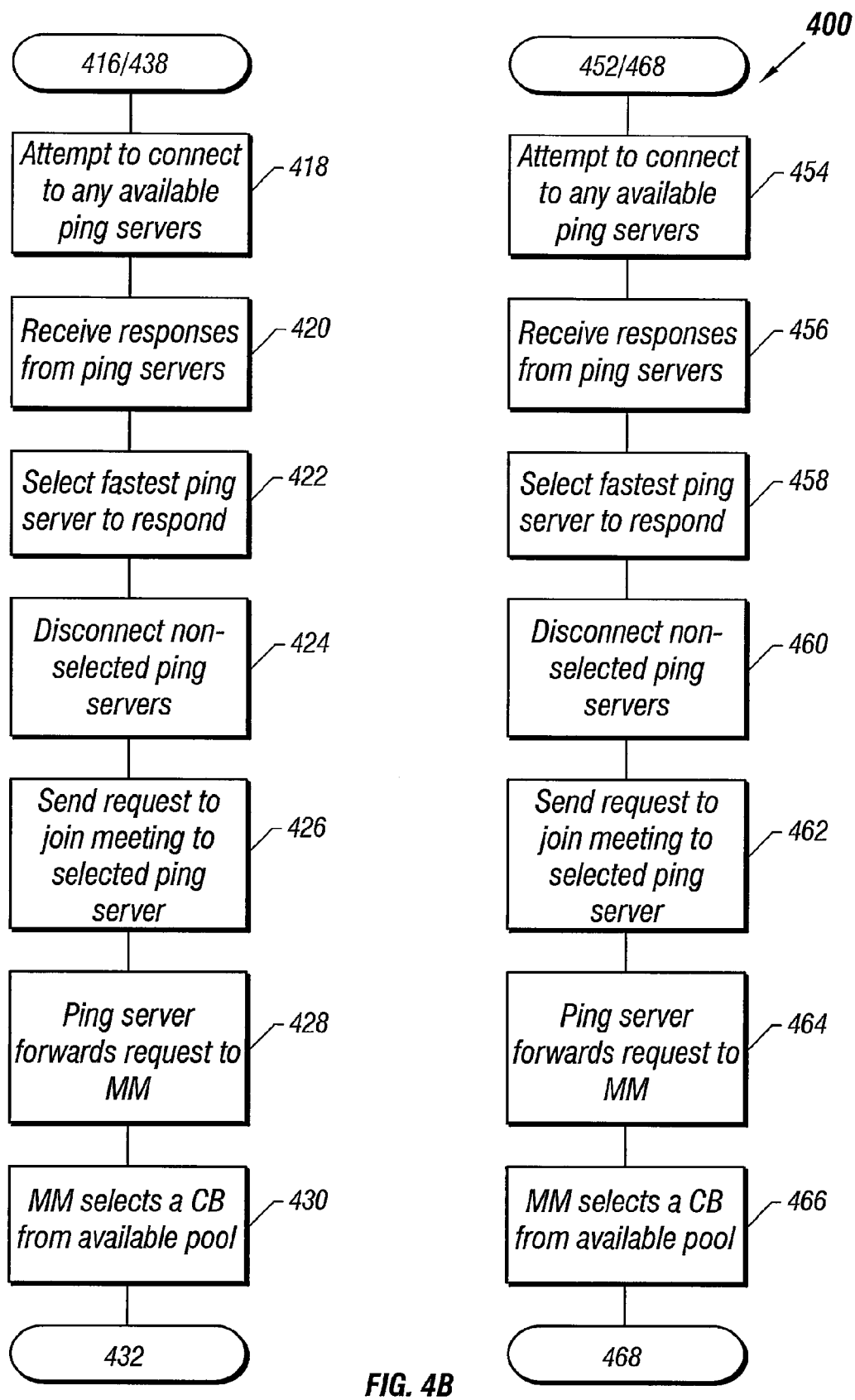
Figure 4C:
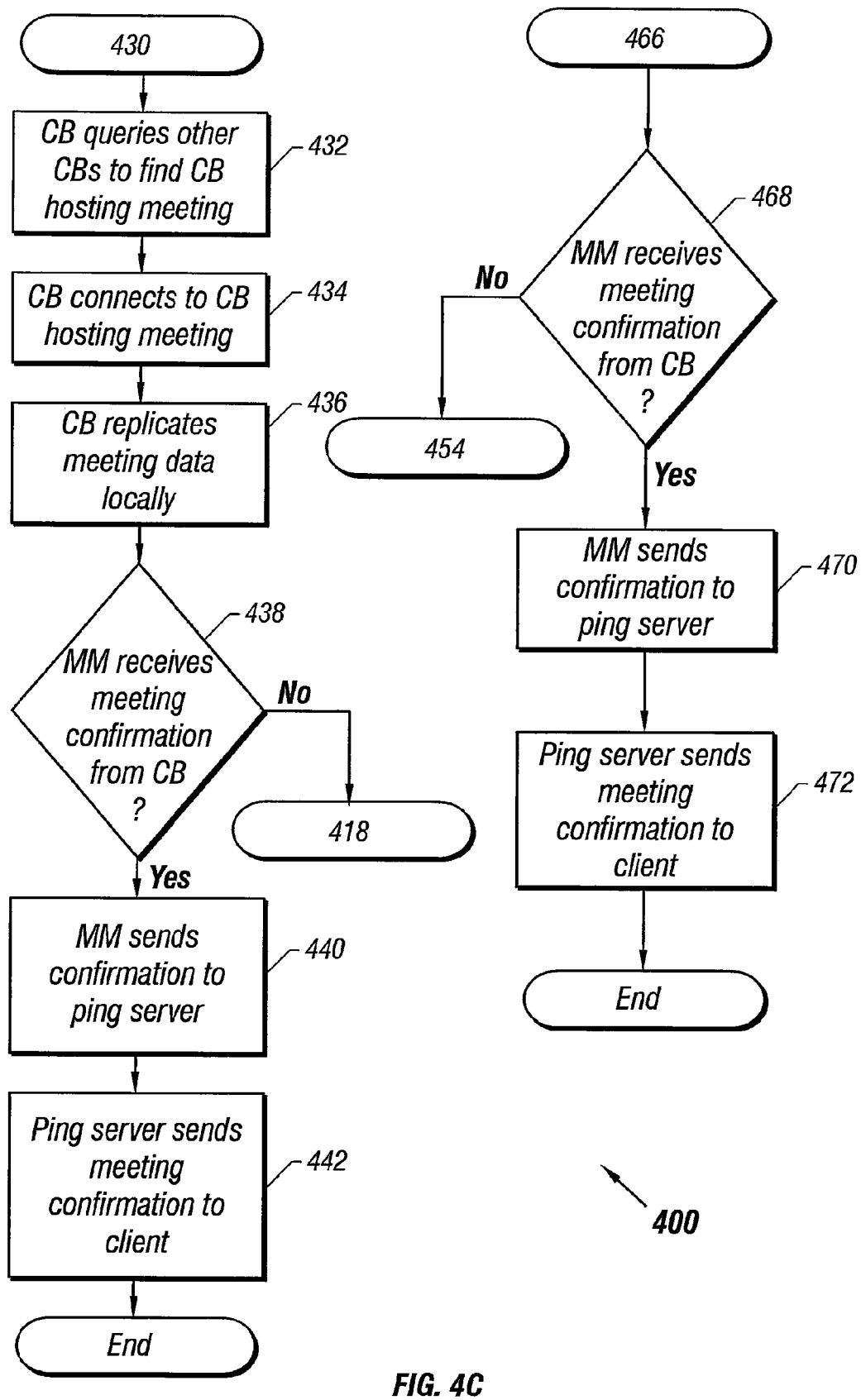

FIGS. 4A-4C are flow diagrams illustrating a start/join conference operation 400 on distributed collaborative computer system 300 (FIG. 3).

First, in stage 402, client browser 320 connects to a web server 335. If the connection is successful (stage 404), operation 400 proceeds to stage 406, otherwise stages 402 and 404 are repeated. In stage 406, the user of client computer 320 logs on to web server 335. In stage 408, the information entered by the user in stage 406 is authenticated with information stored in web database 337. If the information entered by the user cannot be authenticated, stages 406 and 408 may be repeated until the information entered by the user is successfully validated. In some embodiments, client browser 320 is disconnected after a predetermined number of login attempts to prevent unauthorized access to web server 335. As those skilled in the art are familiar with techniques for preventing/deterring unauthorized access to a website, these techniques are not further discussed herein.

Once the user has successfully logged on to web server 335, stage 410 determines whether the user is requesting to start a new conference or join an existing conference. If the user is requesting to join a new conference, operation 400 proceeds to stage 412, otherwise operation 400 proceeds to stage 450.

In stage 412, meeting parameters are extracted from meeting database 365 through web database 337. In stage 414, a plug-in for client browser 320 is launched on client computer 210n (FIGS. 2A and 2B). The first time the user of client browser 320 connects to web server 335, the plug-in is downloaded over global-area network 130 and installed on the client computer 210n. After the plug-in is installed on client computer 210n, it can be re-used for subsequent conferences without the need for downloading and reinstalling it. In some embodiments, multiple versions of the plug-in are used over time: when a new version of the plug-in becomes available on web server 335, the new plug-in is downloaded to client computer 210n and installed in place of the older version of the plug-in.

In stage 416, the meeting parameters are sent from meeting database 365 (via web database 337) to client computer 210n and operation 400 proceeds to stage 418 (FIG. 4B).

In stage 418, client browser 320 attempts to connect to any available ping server 355. In stage 420, responses are received from one or more ping servers 355. In some embodiments, if no response is received within a predefined time limit, stages 418 and 420 are repeated until a response is received within either the original time limit or a newly defined time limit. Client browser 320 selects the fastest ping server 355 to respond to the connection request (stage 422) and disconnects the non-selected ping servers 355 (stage 424). Client browser 320 then sends a request to join a meeting to the selected ping server 355 (stage 426) and ping server 355 forwards the request to a meeting manager (MM) 350 (stage 428) in the same meeting zone 310 n (FIG. 3) as ping server 355.

Upon receiving the request to join a meeting, meeting manager 350 selects a collaboration (CB) server 380n from a pool of available CB servers 380n in the meeting zone 310n (stage 430). In stage 432 (FIG. 4C), the selected CB server 380n queries other CB servers 380n in all meeting zones 310n to ascertain which CB server 380n is hosting the meeting to which the user of client browser 320 is attempting to connect. Once client CB server 380n locates the hosting CB server 380n, it connects to the hosting CB server 380n (stage 434). Client CB server 380n then makes a local copy of the meeting data from hosting CB server 380n.

Stage 438 determines whether meeting manager 350 has received a meeting confirmation from client CB server 380n, in which case operation 400 proceeds to stage 440. Otherwise stages 418-438 are repeated with a new client CB server 380n.

In stage 440, meeting manager 350 has received confirmation from CB server 380n that a connection has been successfully established with the hosting CB server 380n. The confirmation is then transmitted from meeting manager 350 to ping server 355 and from ping server 355 to client browser 320 (stage 442).

If the user requests starting a new meeting in stage 410, operation 400 proceeds to stages 450-472. Stages 450-466 are analogous to stages 414-430 and stages 468-472 are analogous to stages 438-442, except that if stage 468 fails, operation 400 proceeds to stage 454 rather than stage 418.

Figure 5:
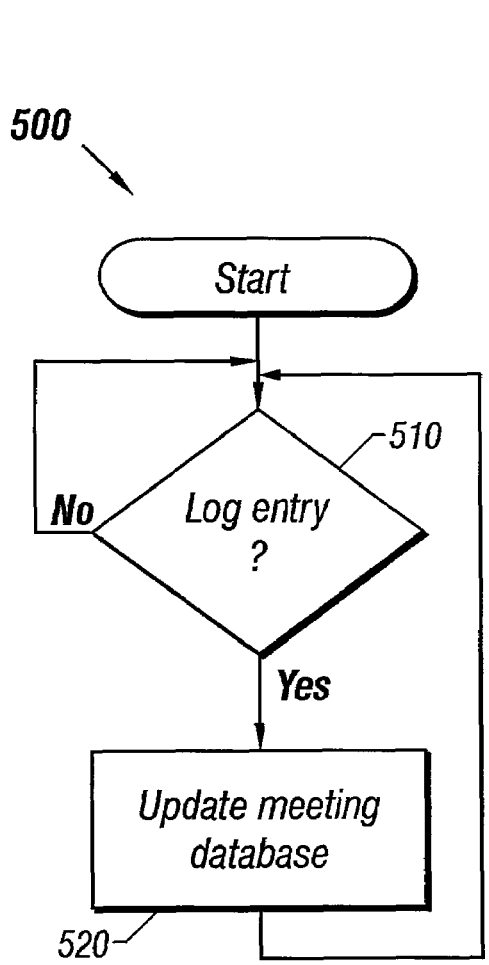
FIG. 5 is a flow diagram of the operation of the log server of FIG. 3.

FIG. 5 is a flow diagram of the operation 500 of log server 370 of FIG. 3. In operation 500, stage 510 determines whether a new log entry has been posted and stage 520 updates meeting database 365 (FIG. 3).

Figure 6:
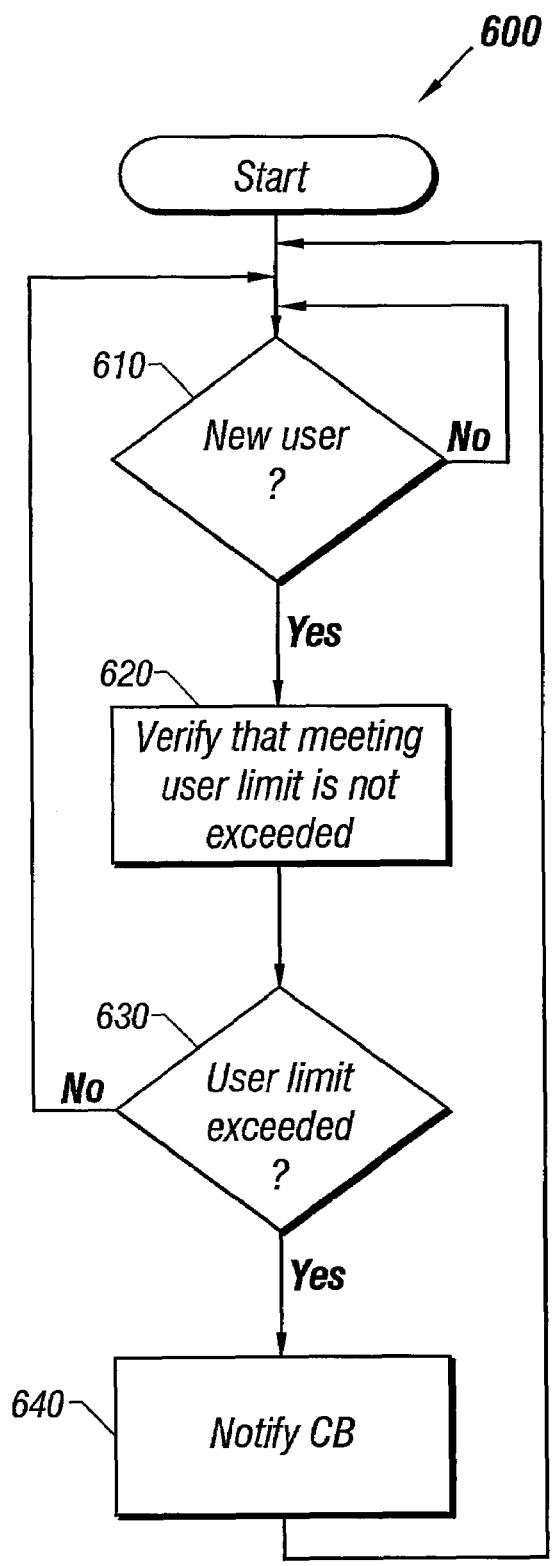
FIG. 6 is a flow diagram of the operation of the license server of FIG. 3.

FIG. 6 is a flow diagram of the operation 600 of license server 360 of FIG. 3. First, stage 610 determines if a new user has requested joining the meeting, in which case operation 600 proceeds to stage 620. Otherwise, stage 610 is repeated. In stage 620, license manager 360 compares the number of users in the meeting if the current user were allowed to join the meeting to the user limit for the meeting. Stage 630 then determines whether the user limit is exceed, in which case CB server 380n is notified (stage 640). Otherwise stages 610-630 are repeated.

Figure 7:
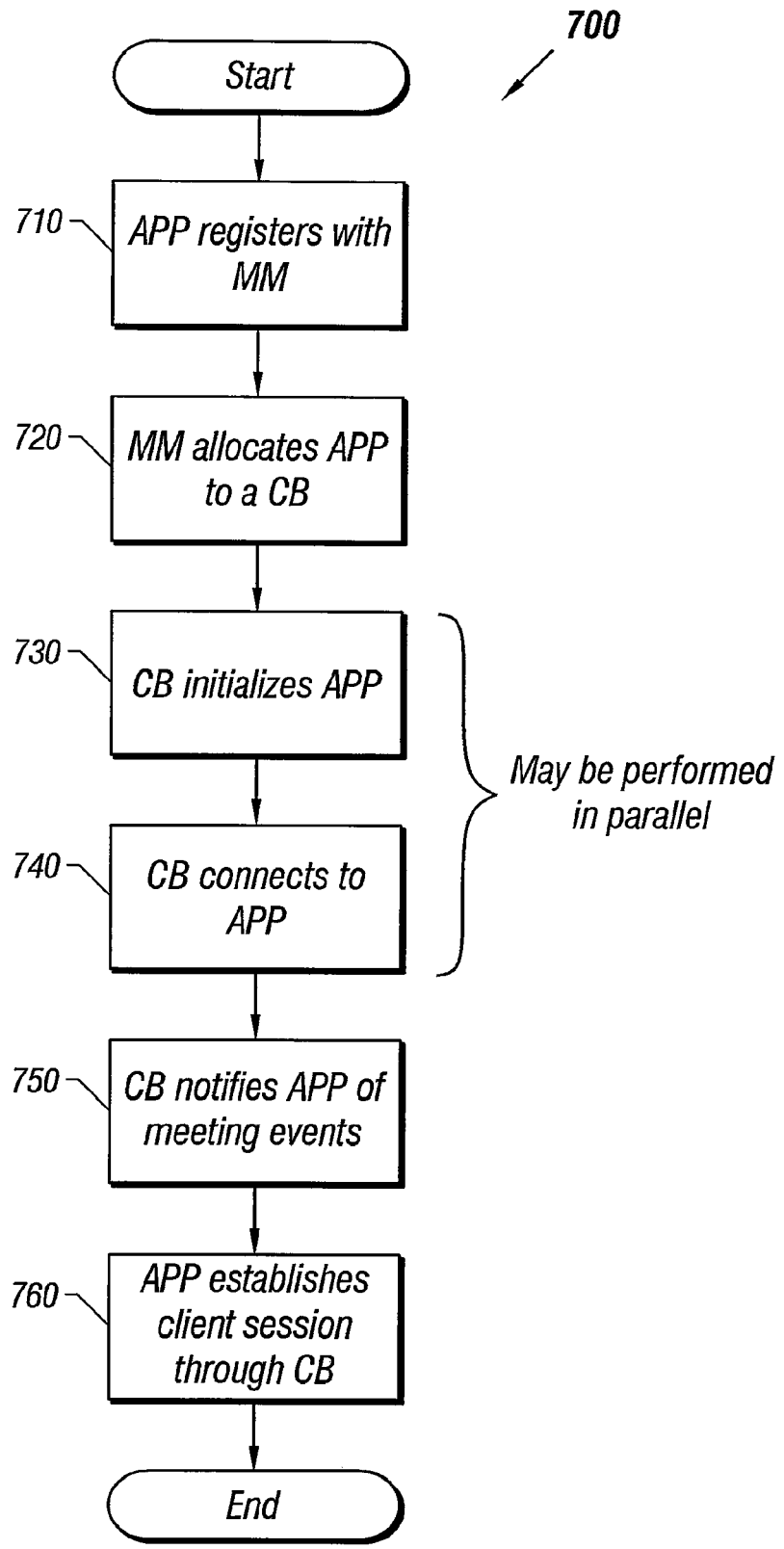
FIG. 7 is a flow diagram of the operation of an App server of FIG. 3.

FIG. 7 is a flow diagram of the operation 700 of an application (App) server 390n of FIG. 3. First, App server 390n registers with meeting manager 350 in the same meeting zone 310n (FIG. 3) in stage 710. Meeting manager 350, in turn, allocates App server 390n to a CB server 380n handling a given conference (stage 720). CB server 380n, in turn, initializes App server 390n with the necessary application data required for the conference (stage 730) and establishes a connection to App server 390n (stage 740) via ZMs 313. CB server 380n notifies App server 390n of meeting events (e.g., users joining/leaving the meeting or control passing from the host to another user) in stage 750. Finally, App server 390n establishes a connection with client browser 320 via CB server 380n (stage 760) which allows users of client browsers 320 to access and interact with the application provided by App server 390n.

FIGS. 8-11 are flow diagrams illustrating the operation of meeting manager (MM) 350 for providing fault tolerance to distributed collaborative computer system 300.

Figure 8:
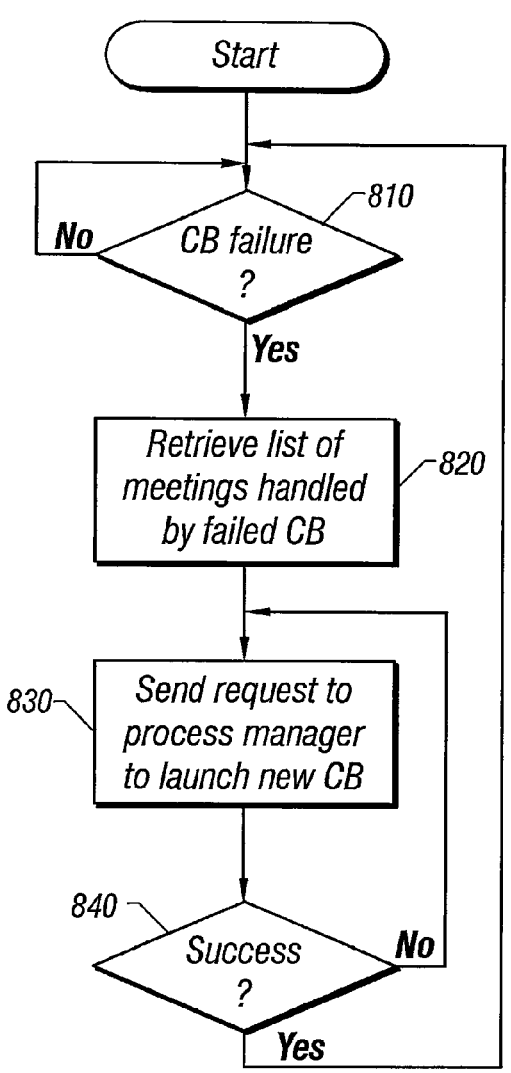

FIG. 8 illustrates CB server failure detection and recovery operation 800. First, meeting manager 350 checks whether any CB servers 380n in the meeting manager's meeting zone 310n have failed (stage 810). A variety of techniques known in the art can be employed to detect failure of CB servers 380n. For example, CB servers 380n can periodically transmit a "heartbeat" message to meeting manager 350. If meeting manager 350 does not receive a heartbeat message from a CB server 380n within a predefined time limit, meeting manager 350 attempts to contact CB server 380n and if no response is received from CB server 380n within a predefined time limit, meeting manager 350 determines that CB server 380n has failed. Other failure detection techniques known in the art can be used to detect failure of a CB server 380n in accordance one or more embodiments of the present invention. Accordingly, the present invention is not limited to any particular failure detection technique.

In some embodiments of the present invention, meeting manager 350 employs its zone manager (and meeting zone gatekeeper) (ZM/GK) 214 to exchange heartbeat (or analogous) messages with ZM 313 in each CB server 380n. When and if ZM/GK 314 detects a CB server (or other logical server failure) by noting a lack of heartbeats, for example, ZM/GK sends a request to process manager (PM) 311 to restart the dead logical server.

PM 311 also monitors each ZM 313, including ZM/GK 314, to evaluate ZM health. Should PM 311 discover a failed or stopped ZM process, the PM will restart (i.e., spawn a replacement for) the ZM.

In particular, if failure of a CB server 380n is detected in stage 810, operation 800 proceeds to stage 820. Otherwise stage 810 is repeated until a failure is detected. Meeting manager 350, in turn, retrieves a list of meetings handled by failed CB server 380n from meeting database 365 (stage 820) and sends a request to process manager 311 to launch a new CB server 380n (stage 830).

The newly-spawned (replacement) CB server recovers its state information (e.g., information describing its configuration, operating or quality of service [QoS] parameters, and/or current meeting data) from the local meeting zone's gatekeeper. Typically, this is the ZM/GK 314 within zone manager 350, but the gatekeeper function may alternately be provided by any designated ZM 313. Generally speaking, all local state in a logical server is preserved. However, if an application server goes down, the application state is lost. Only the meeting state is preserved in this case.

Stage 840 then determines if the new CB server 380n has successfully come on-line, in which case meeting manager 350 continues to monitor the status of CB servers 380n (stage 810). Otherwise, stages 830-840 are repeated until a new CB server 380n successfully comes on-line.

Figure 9:
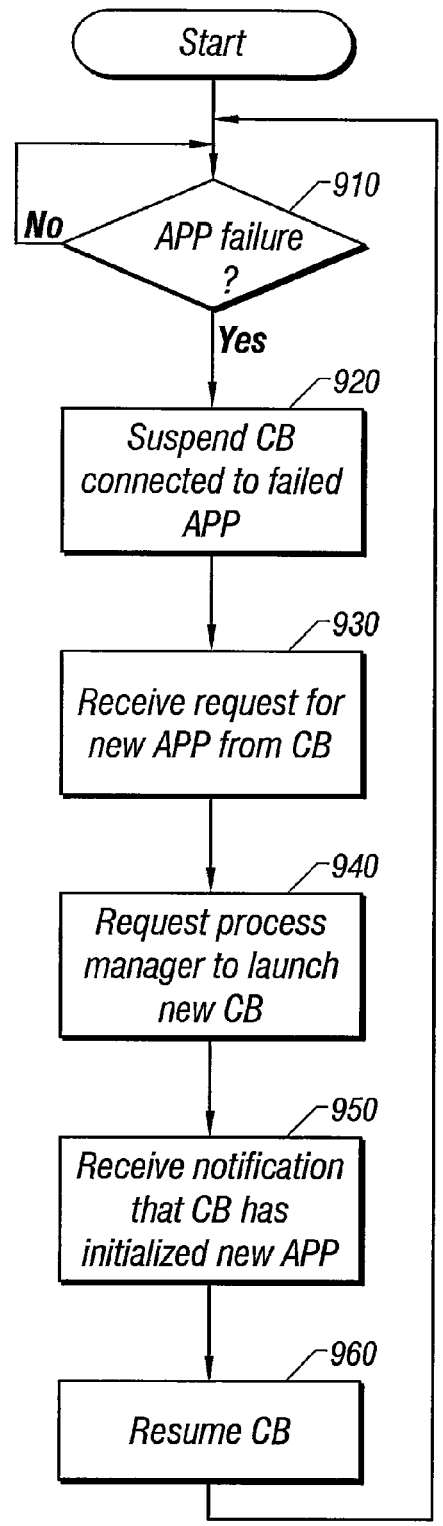

FIG. 9 illustrates the application server failure detection and recovery operation 900. First, meeting manager 350 and CB servers 380n (FIG. 3) check whether any App servers 390n in the same meeting zone 310n as meeting manager 350 and CB servers 380n have failed. As explained above, this can be accomplished using any failure detection technique known in the art. In case CB server 380n detects a failure of an App server 390n before meeting manager 350, CB server 380n notifies process manager 311 through the zone manager 313 communication path. In some embodiments, the zone managers communicate with each other and the designated ZM/GK 314 using the well-known TCP/IP protocol and simple messages whose content and format are readily apparent to those of ordinary skill in the inter-process communication arts. In other embodiments, the WebEx Transport Layer protocol is used.

The WebEx Transport Layer protocol (TP) is responsible for providing point-to-point connectivity between a WebEx client and the WebEx server. The TP layer will attempt to create direct TCP connections and use TCP to communicate between the client and server. For clients that sit behind firewalls, particularly for those that are unable to create direct TCP connections, the WebEx TP layer will automatically create virtual sockets based upon HTTP. This enables the client to communicate with the server through most firewalls.

Since the HTTP protocol functions on a Request/Response basis, it is always the client that issues the Request command. Hence, in order to provide a bi-directional communication channel, the client actively polls the server in order to fetch the data that may be sent from the server to the client. The details of this implementation are available in the co-pending and commonly-assigned Application for a U.S. patent Ser. No. 09/449,011, filed on Nov. 24, 1999, now U.S. Pat. No. 6,789,119, "Emulating a Persistent Connection Using HTTP," cited and incorporated above.

If a failure of App server 390n is detected, operation 900 proceeds to stage 920. Otherwise stage 910 is repeated. In stage 920, meeting manager 350 places any CB servers 380n connected to failed App server 390n in a suspend state and receives a request for a new App server 390n from CB server 380n in stage 930. Meeting manager 350 then requests that process manager 311 launch a new App server 390n (stage 940). Process manager 311 launches the new App server 390n and notifies meeting manager 350 (stage 950).

Once meeting manager 350 has received notification that the new App server 390n has been launched, meeting manager 350 resumes (i.e., removes from the suspend state) CB server 380n and connects it to the new App server 390n. (App server state is restored from a backup meeting manager, through any of a number of standard and common means well-known in the art.) Meeting manager continues to monitor the status of App server 390n (stage 910). Note that all logical server-to-logical server and logical server-to-PM communications employ ZMs 313 and 314.

FIG. 10 illustrates the license/log manager failure detection and recovery operation 1,000. First, meeting manager 350 checks whether license manager 360 or log server 370 have failed, using similar techniques to the ones described above in reference to FIGS. 8 and 9. If a failure is detected, operation 1000 proceeds to stage 1020. Otherwise, stage 1010 is repeated until a failure is detected. Meeting manager 350, in turn, sends a request to process manager 311 to launch a new license manager 360 or log server 370 (stage 1020), as required. Stage 1030 then determines whether the new license manager 360 or log server 370 has successfully come on-line, in which case meeting manager 350 continues to monitor the status of license manager 360 and log server 370 (stage 1010). Otherwise, stages 1030 and 1040 are repeated until a new license manager 360 or log server 370 has been successfully started.

Note that the reliable TP layer keeps all data and resends/reloads it into the replacement license and/or log server as needed.

FIGS. 8-10 thus show how meeting manager 350 monitors the status of other components in its meeting zone 310n. However, to provide even more effective fault tolerance, the status of meeting manager 350 must also be monitored to prevent a single point of failure in the system. This is accomplished by providing both a primary and one or more standby meeting managers 350 in each meeting zone 310n. In addition, process manager 311 is responsible for detecting failure of the primary meeting manager 350 and transferring control to one of the backup meeting managers 350. Operability of the process manager, in turn, is guaranteed by a hardware time-out restart process.

FIG. 11 illustrates meeting manager failure detection and recovery operation 1100. In each meeting zone 310n (referring to FIG. 3), there is instantiated one primary meeting manager 350 and one or more secondary meeting managers (not shown). Process manager 311 continually checks whether primary meeting manager 350 has failed (stage 1110), again using standard failure detection techniques. If a failure of primary meeting manager 350 is in fact detected, operation 1110 proceeds to stage 1120. Otherwise, stage 1110 is repeated.

In stage 1120, process manager 311 launches a new standby meeting manager. The pre-existing standby meeting managers, advised of the failure of primary meeting manager by process manager 311, elect (through any of several well-known server election or promotion mechanisms) one of their own (step 1140) to take over as primary and broadcast an election message (stage 1140). One of the standby meeting managers is thus selected as the new primary meeting manager 350 (stage 1150). In the event only one standby MM is presently configured, the election message of stage 1140 is simply construed as a command to become the primary MM.

The standby meeting manager(s) 350, CB servers 380n, App server 390n, ping servers 355, license manager 360, and log server 370 in the same meeting zone 310n as new primary meeting manager 350 connect to new primary meeting manager 350 (stage 1160) and register with it (stage 1170) so that the new primary meeting manager can continue to monitor the status of these servers. New primary meeting manager 350 recovers its server state (stage 1180) and receives reports from CB servers 380n on the status of any active conferences handled by CB servers 380n (stage 1190). Finally, new primary meeting manager 350 recovers meeting information for all meetings handled in the meeting zone 310n (stage 1190). Process manager 311 monitors the status of new primary meeting manager 350 (stage 1110).

Figure 12:
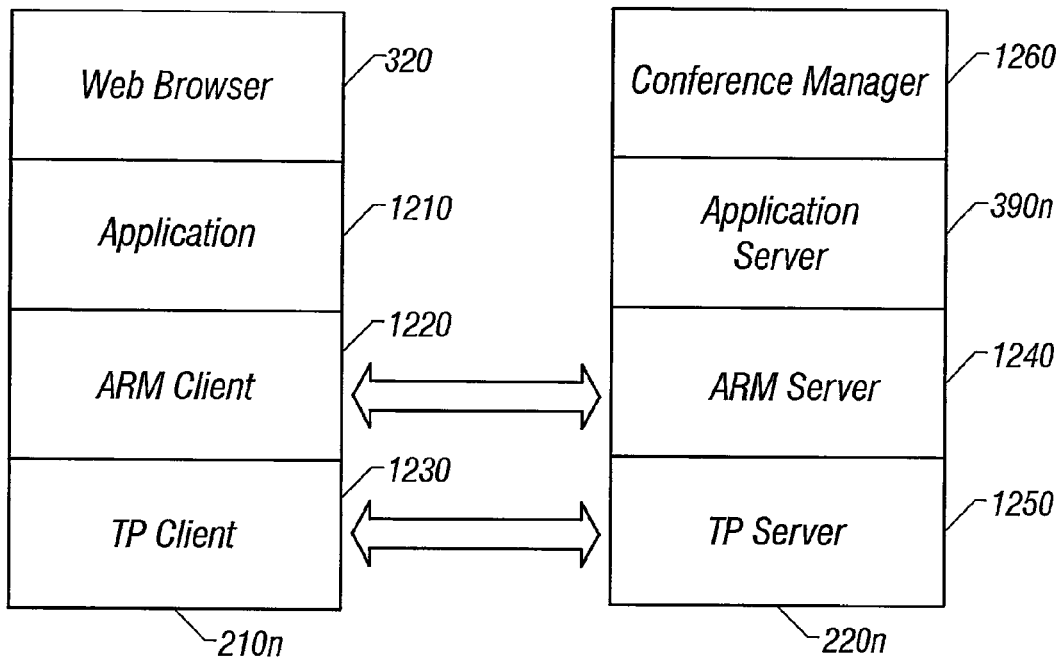
FIG. 12 is a block diagram illustrating the software components of the client and server computers of FIGS. 2A and 2B.

CB server 380n interfaces with client browser 320 through application protocol entities (APEs) joined to agent sessions. FIG. 12 is a block diagram illustrating the software components of client computers 210n and server computers 220n (FIGS. 2A and 2B) involved in the communications between CB server 380n and client browser 320. In particular, communications channels are established between transaction processing (TP) server 1250 and Application Resource Manager (ARM) server 1240 on server computer 220n and TP client 1230 and ARM client 1220 on client computer 210n. Thus, conference manager 1260 and App server 390n (both logically part of CB server 380n) communicate with client computer 210n via the communication channels maintained by ARM server 1240 and TP server 1250.

Figure 13A:
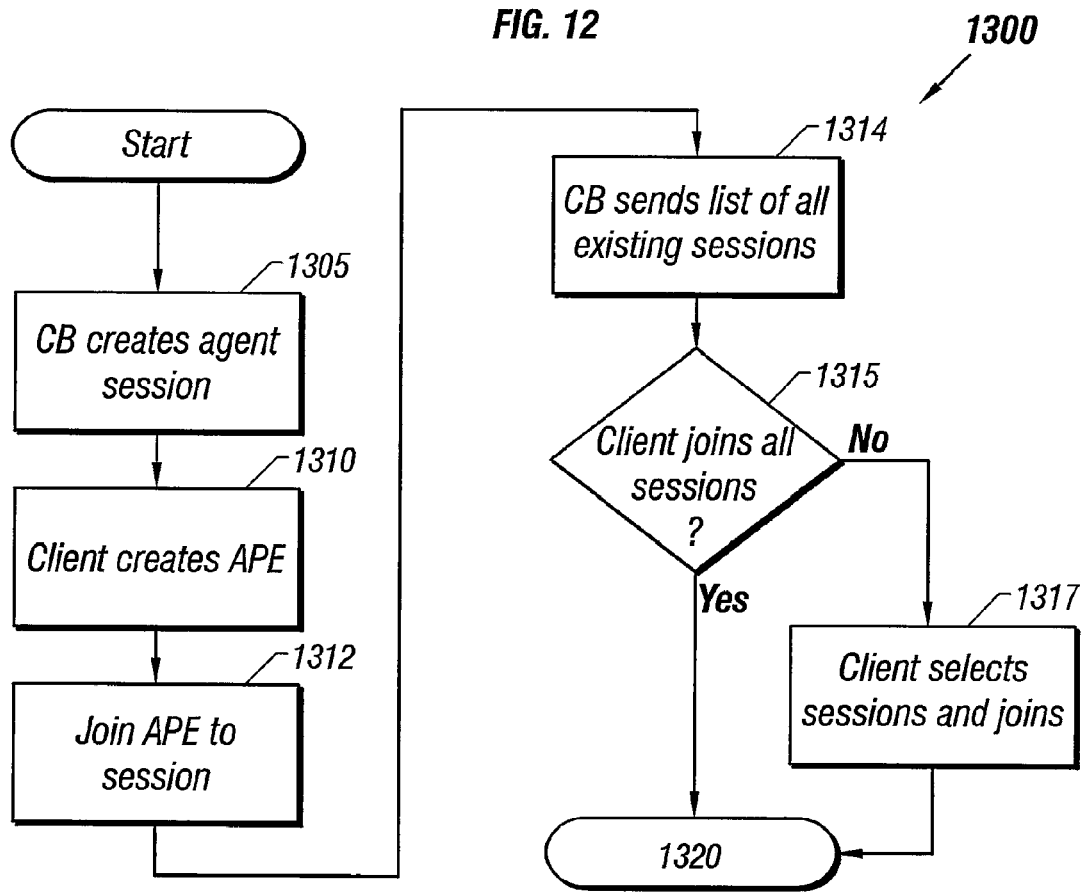
FIGS. 13A, 13B, and 13C are flow diagrams illustrating the operation of the CB server and App servers of FIG. 3.
Figure 13B:
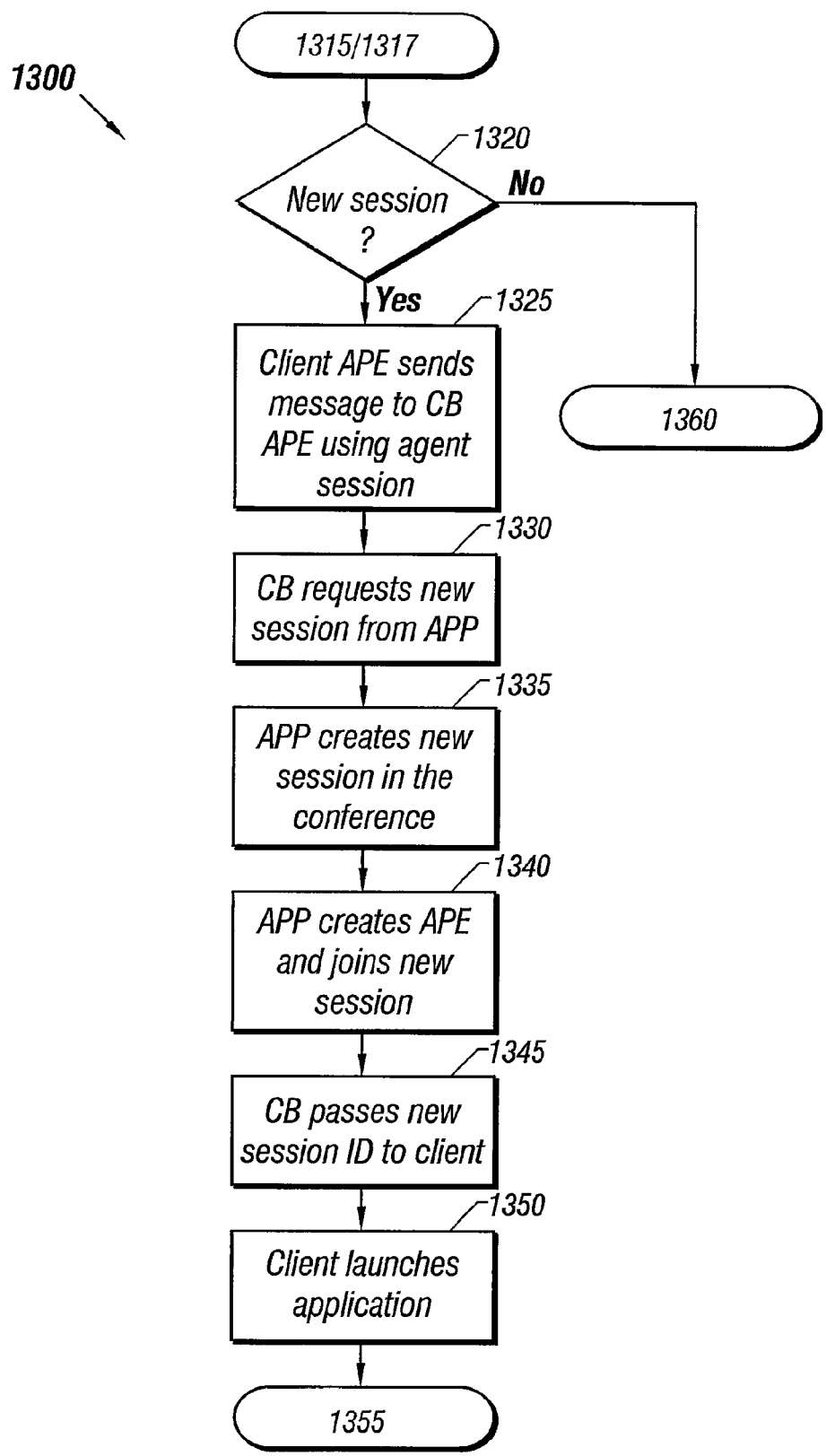
Figure 13C:
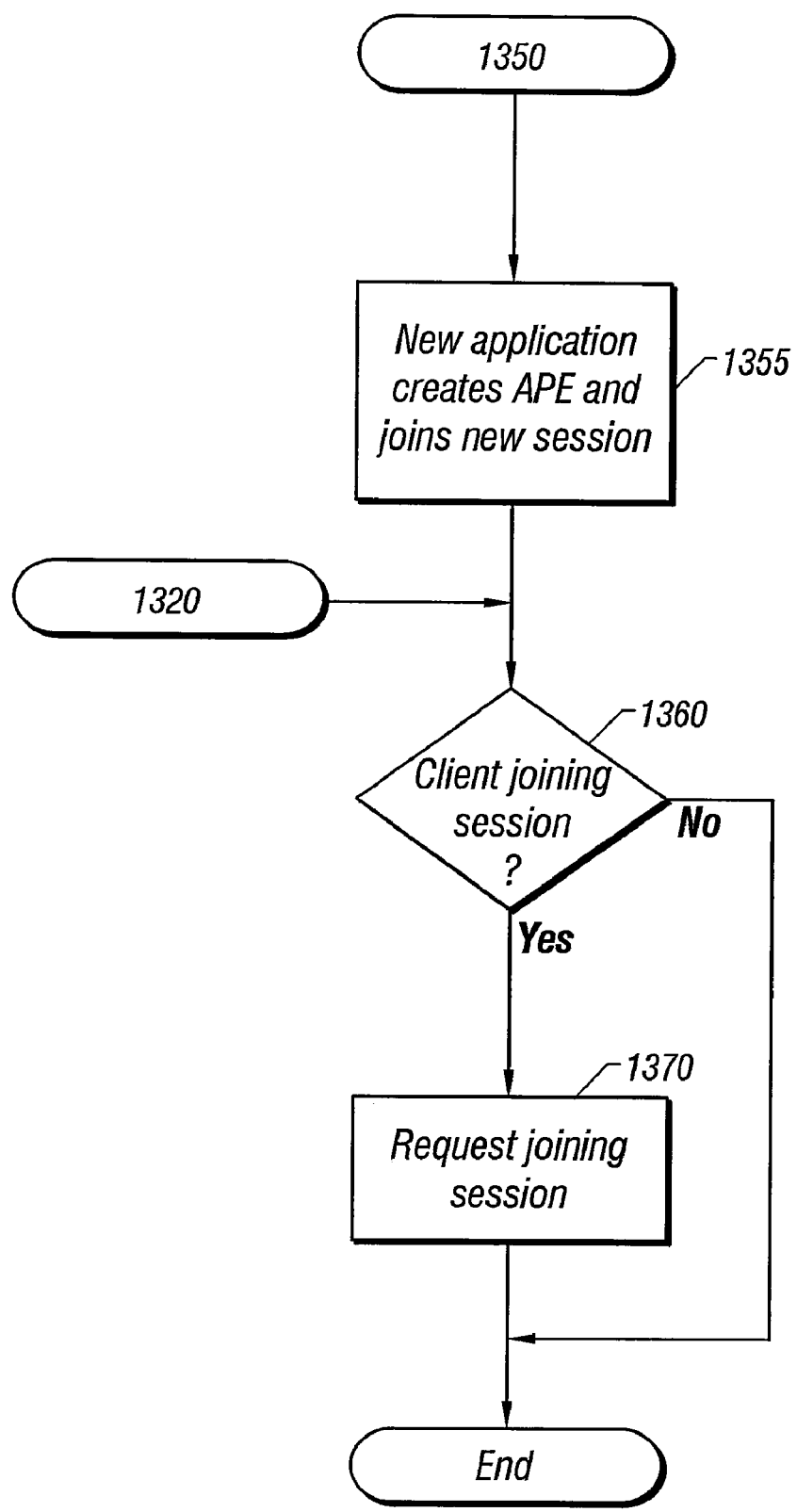

FIGS. 13A-13C are flow diagrams illustrating the operation 1300 of CB server 380n and App server 390n to setup communications with client browser 320 (FIG. 3). First, CB server 380n creates an agent session (stage 1305). The agent session controls communications from client computer 210n to CB server 380n and can launch new, additional data sessions if required. To communicate with CB server 380n, client computer 210n, in turn, creates an APE (stage 1310) and joins the APE to the agent session (stage 1315). In stage 1316, CB server 380n sends a list of all existing session to the client computer 210n; in stage 1317, the client must chose whether to join all or only some sessions. If client computer 210n joins all sessions, control passes to stage 1320, shown in FIG. 13B. If not, stage 1318, the client joins only selected sessions before control passes to stage 1320.

Stage 1320 (FIG. 13B) determines whether the user of client computer 210n has elected to create a new session (e.g., to share an application), in which case operation 1300 proceeds to stage 1325. Otherwise, operation 1300 proceeds to stage 1360. Client computer 210n APE then sends a message to the agent session APE of CB server 380n requesting a new session (stage 1325). CB server 380n, in turn, requests a new session from App server 390n (stage 1330) and App server 390n creates the new session for the conference (stage 1335). App server 390n also creates a new APE and joins the new session to the new APE (stage 1340). CB server 380n, in turn, sends the new session's ID to client computer 210n (stage 1345). Client computer 210n launches an application (stage 1350), creates a new APE for the application and joins the new APE to the new session (stage 1355, referring to FIG. 13C).

Stage 1360 determines if a new client computer 210n wants to join an existing session, in which case operation 1300 proceeds to stage 1370. Otherwise, operation 1300 terminates. Client computer 210n requests joining the session (stage 1370), concluding operation 1300.

Figure 14:
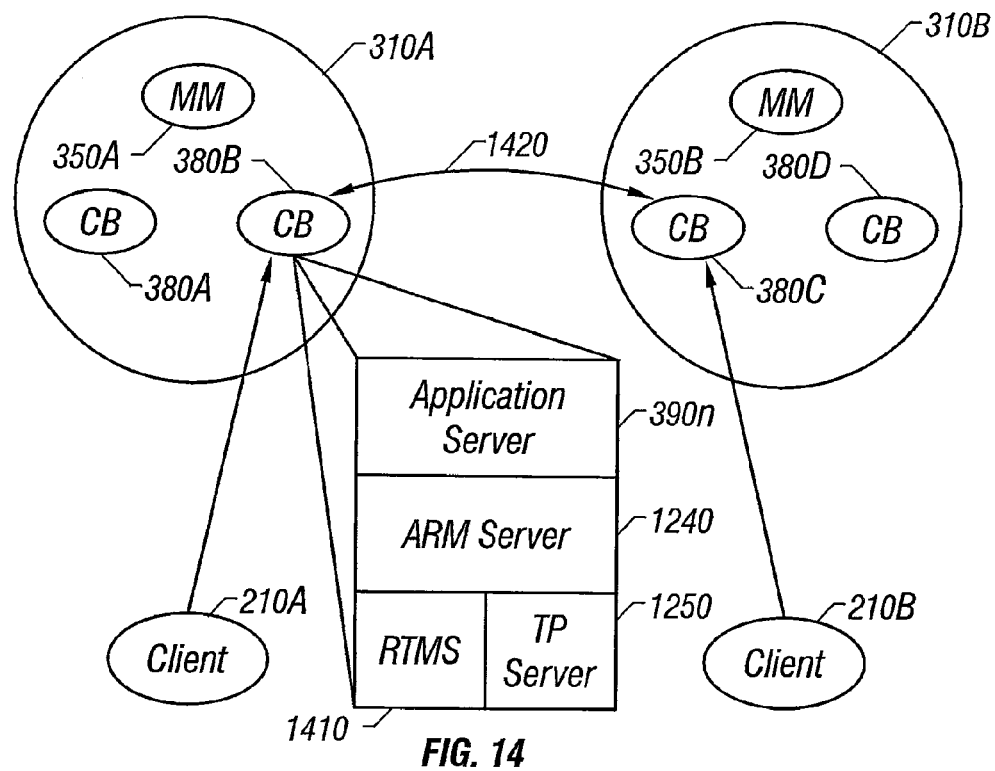
FIG. 14 is a block diagram illustrating the communication channels established between two client computers of FIG. 3 during an on-line conference, in accordance with an embodiment of the invention.

FIG. 14 is a block diagram illustrating the communication channels established between client computers 210A and 210B during an on-line conference, in accordance with an embodiment of the invention. Client computer 210A connects to CB server 380B in meeting zone 310A via ARM server 1240 and TP server 1250. In addition, CB server 380B established a high-speed real-time messaging link 1420 with CB server 380C in meeting zone 310B using a real-time messaging service (RTMS) 1410. In one embodiment of the present invention, RTMS 1410 is implemented using the well-known TCP/IP communications protocol. In some alternate embodiments, the WebEx Transport Protocol, discussed above, is used.

CB server 380C, in turn, connects to client computer 210B via its own ARM server 1240 and TP server 1250 (not shown).

Figure 15:
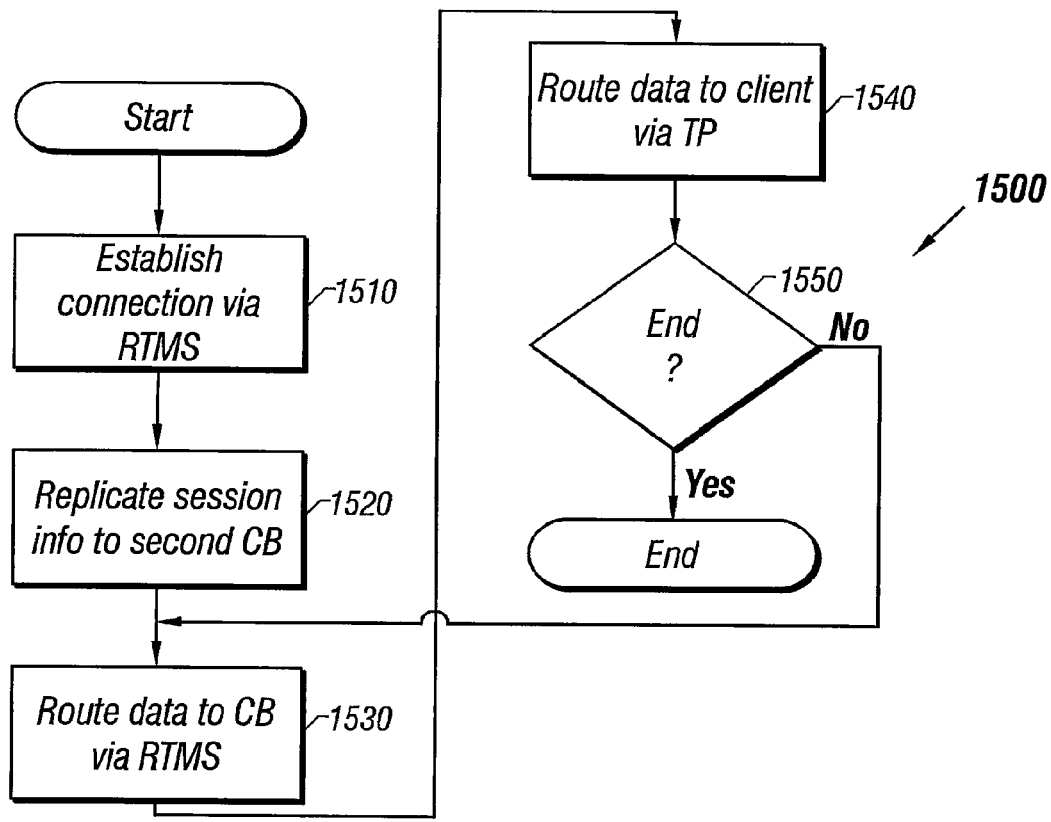
FIG. 15 is a flow diagram of an operation for transmitting data between the client computers of FIG. 14.

FIG. 15 is a flow diagram of operation 1500 for transmitting data from client computer 210A to client computer 210B using distributed collaborative computer system 300 (FIG. 3). First, CB server 380B establishes a link to CB server 380C using real-time messaging service 1410 (stage 1510, as illustrated in FIG. 14). The session information is then replicated from CB server 380B to CB server 380C (stage 1520). Data routed from client computer 210A is then transmitted from CB server 380B to CB server 380C over real-time messaging service 1410 (stage 1530). The data received by CB server 380C is then routed to client computer 210B using TP server 1250 (stage 1540). Stage 1550 then determines if additional data needs to be transmitted from client computers 210A and 210B, in which case stages 1530-1550 are repeated. Otherwise, operation 1500 terminates.

Distributed collaborative computer system 300 allows users of client computers 210n to participate in on-line conferences by sharing both audio and video signals. In particular, distributed collaborative computer system 300 allows users to share images of a document that can be marked-up by conference participants (document viewing). Document viewing is described in further detail in U.S. Pat. No. 5,577, 188 "Method to Provide for Virtual Screen Overlay" and co-pending and commonly-assigned U.S. patent application Ser. No. 09/471,938, now U.S. Pat. No. 6,654,032, and 09/591,377, now U.S. Pat. No. 6,763,501 (filed on Dec. 23, 1999 and Jun. 9, 2000, respectively), cited and incorporated above. In addition, users may share control of an application program executed on any of the client computers 210n participating in the on-line conference (a process known as application sharing). Application sharing is described in further detail in co-pending and commonly-assigned U.S. patent application Ser. No. 09/442,424 (filed Nov. 17, 1999, now U.S. Pat. No. 6,601,087), cited and incorporated above.

Figure 16A:
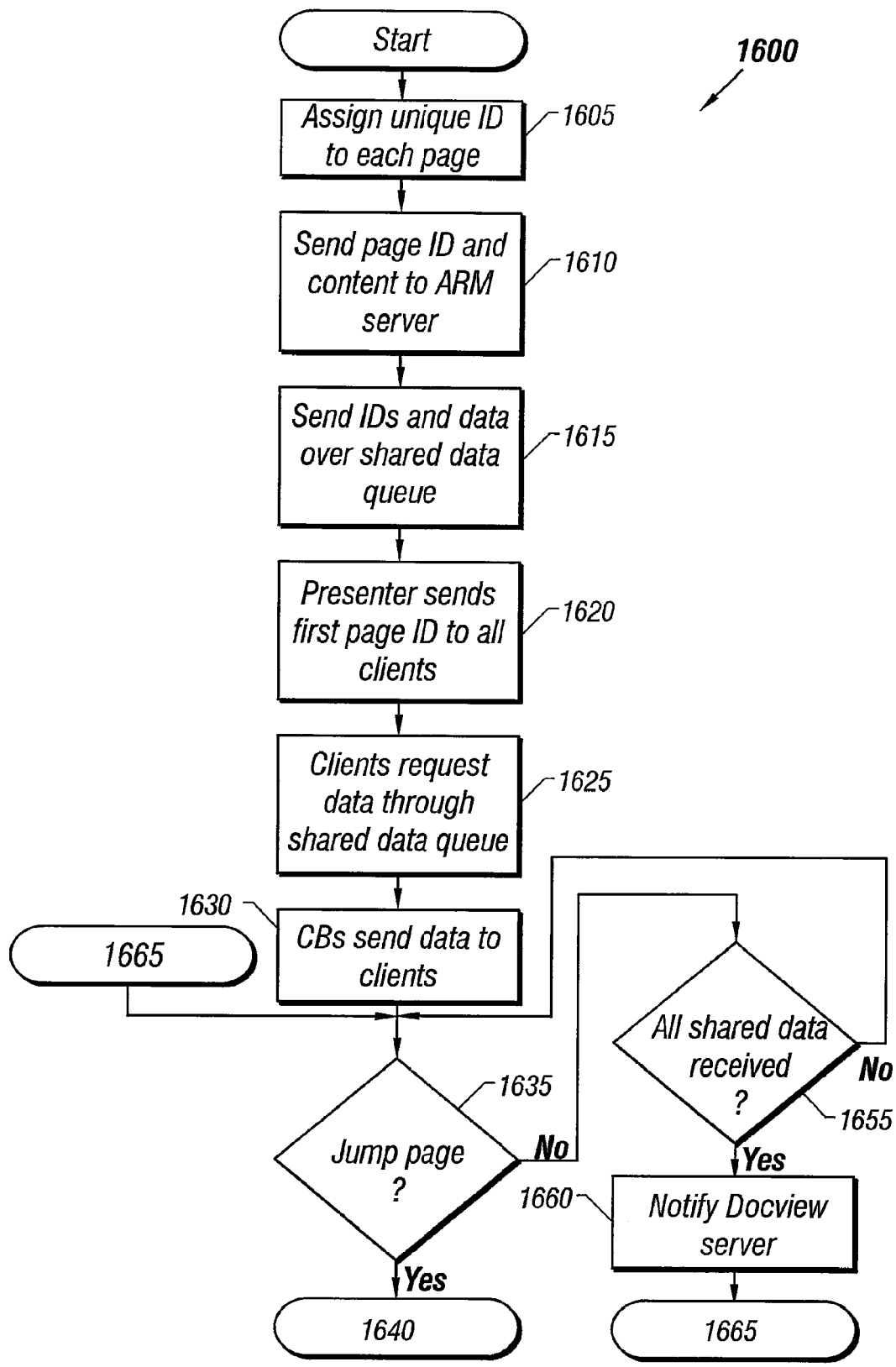
FIGS. 16A and 16B are flow diagram illustrating a skip page operation used to control transmission of pages between a presenter's client computer and other participants' client computers, in accordance with some embodiments of the invention.
Figure 16B:
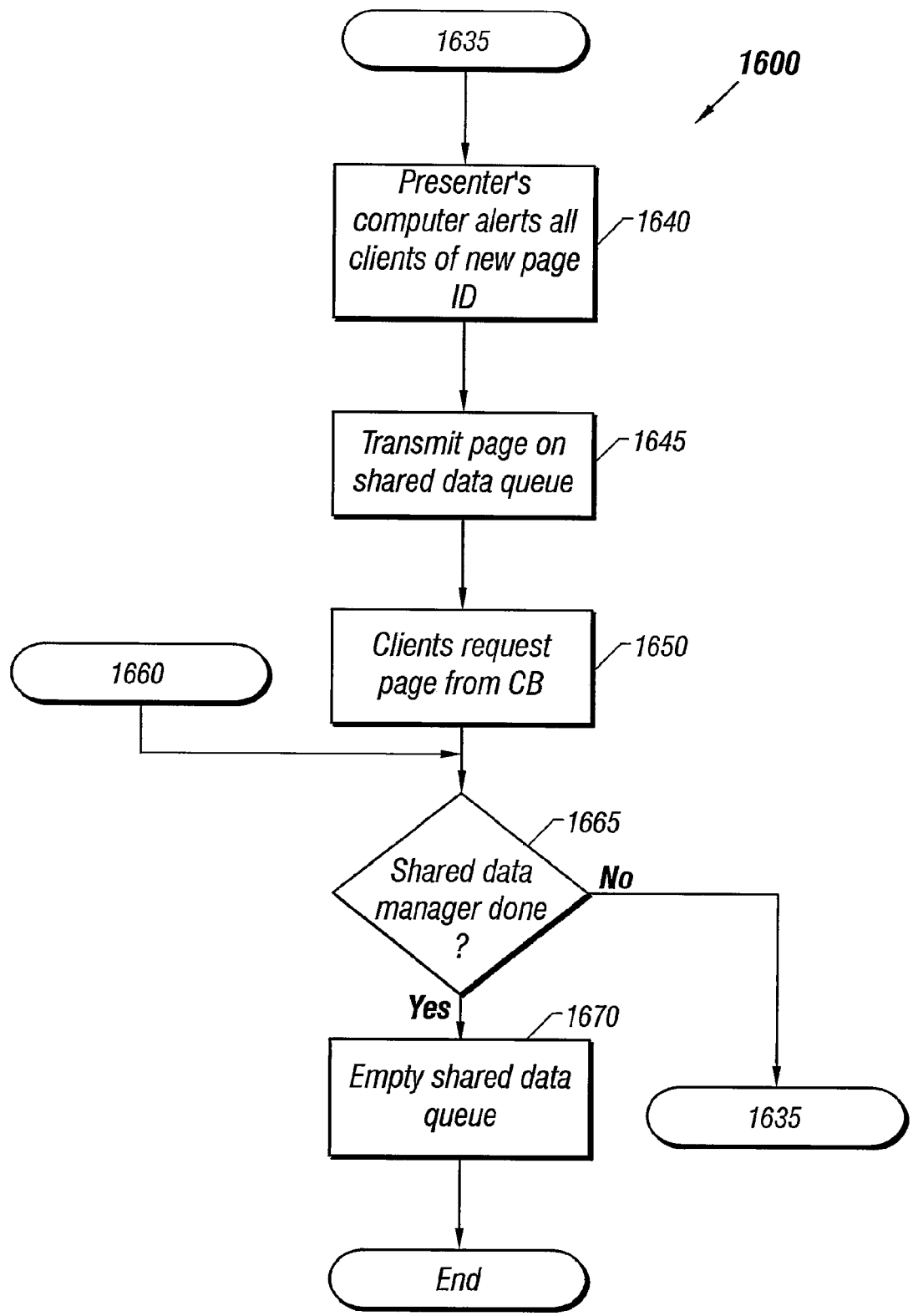

During document viewing, the presenter may choose to skip one or more pages in the document being viewed. FIGS. 16A and 16B are flow diagram illustrating the skip page operation 1600 used to control transmission of pages between the presenter's client computer 210n and other participants' client computers 210n.

First, an App server 390n providing the document viewing application (also referred to as the docview server) assigns unique IDs to each page in the document being viewed (stage 1605, FIG. 16A). The page IDs and page content data are then passed to ARM client 1220 and from ARM client 1220 to ARM server 1240 (stage 1610). ARM server 1240, in turn, begins transmitting the document page IDs and data over a shared data queue on high-speed real-time messaging link 1420 (stage 1615). The first page ID is then sent to all client computers 210n connected to the conference (stage 1620). Client computers 210n, in turn, request the first page data from the shared data queue (stage 1625) and CB server 380n sends the first page data to client computers 210n (stage 1630). Stage 1635 then determines whether the presenter has elected to jump to a new page in the shared document, in which case operation 1600 proceeds to stage 1640. Otherwise, operation 1600 proceeds to stage 1655. In stage 1640 (FIG. 16B), the presenter's client computer 210n broadcasts the new page ID to all client computers 210n participating in the conference. The new page data is then transmitted over the shared data queue (stage 1645) and client computers 210n request the new page from the shared media queue (stage 1650).

Alternatively, stage 1655 determines if all data transmitted on the shared data queue has been received, in which case the docview server is notified (stage 1660. Otherwise, operation 1600 proceeds to stage 1635.

Figure 17:
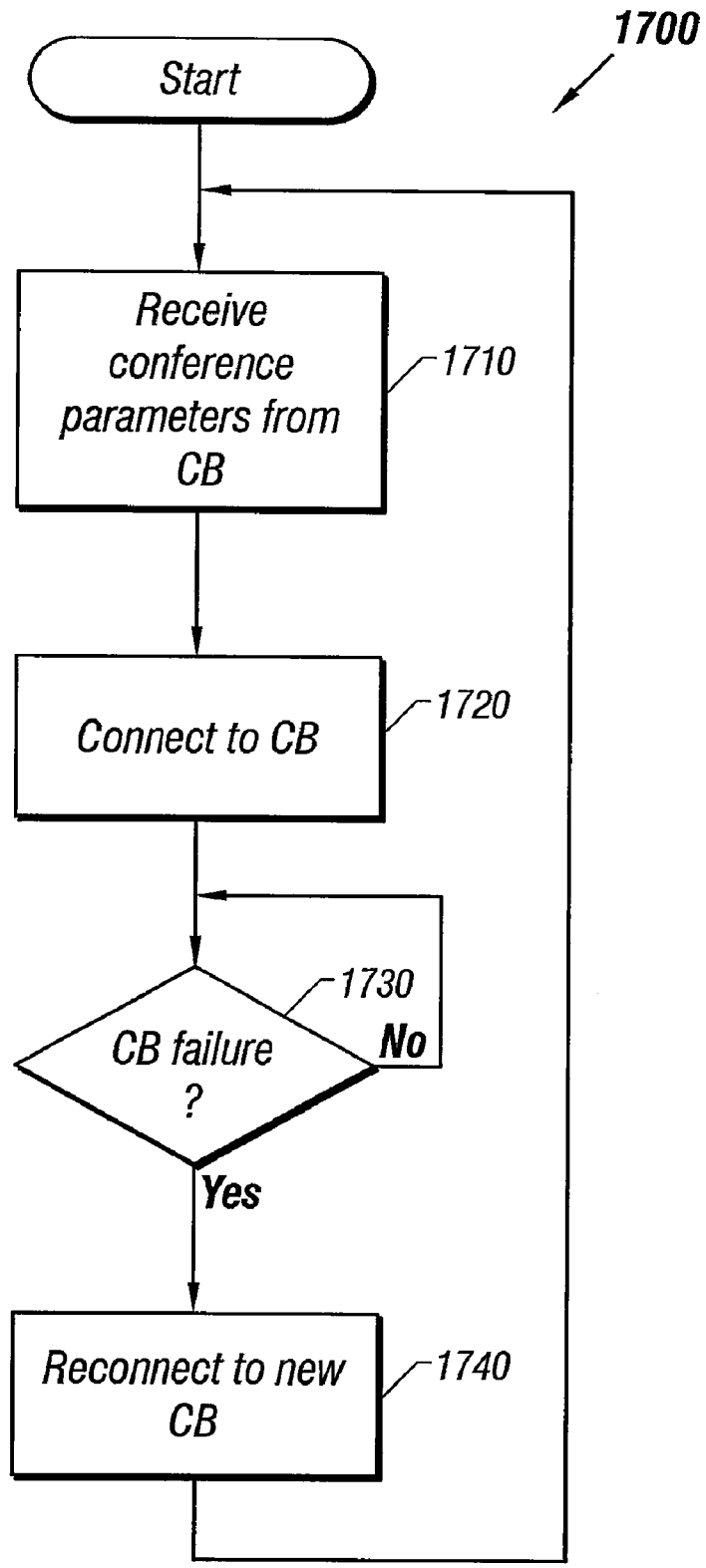
FIG. 17 is a flow diagram of a client browser operation, in accordance with some embodiment of the invention.

Stage 1665, in turn, determines whether the shared data queue is no longer needed, in which case the shared data queue is emptied (stage 1670) and operation 1600 terminates. Otherwise, operation 1600 proceeds to stage 1635. FIG. 17 is a flow diagram of a client browser operation 1700, in accordance with some embodiments of the invention. First, client browser 320 receives conference parameters from CB server 380$n$ (stage 1710). Client browser 320 then connects to CB server 380$n$ (stage 1720) to participate in the conference. Stage 1730 checks the status of CB server 380$n$. If a failure of CB server 380$n$ is detected, client browser 320 attempts Otherwise, client browser 320 continues to monitor the status of CB server 380$n$.

FIGS. 18A, 18B, 18C1-3, 19A, 19B, 20A, 20B and 20C are views of web pages displayed by client browser 320 (FIG. 3) during operation of distributed collaborative computer system 300.

Figure 18A:
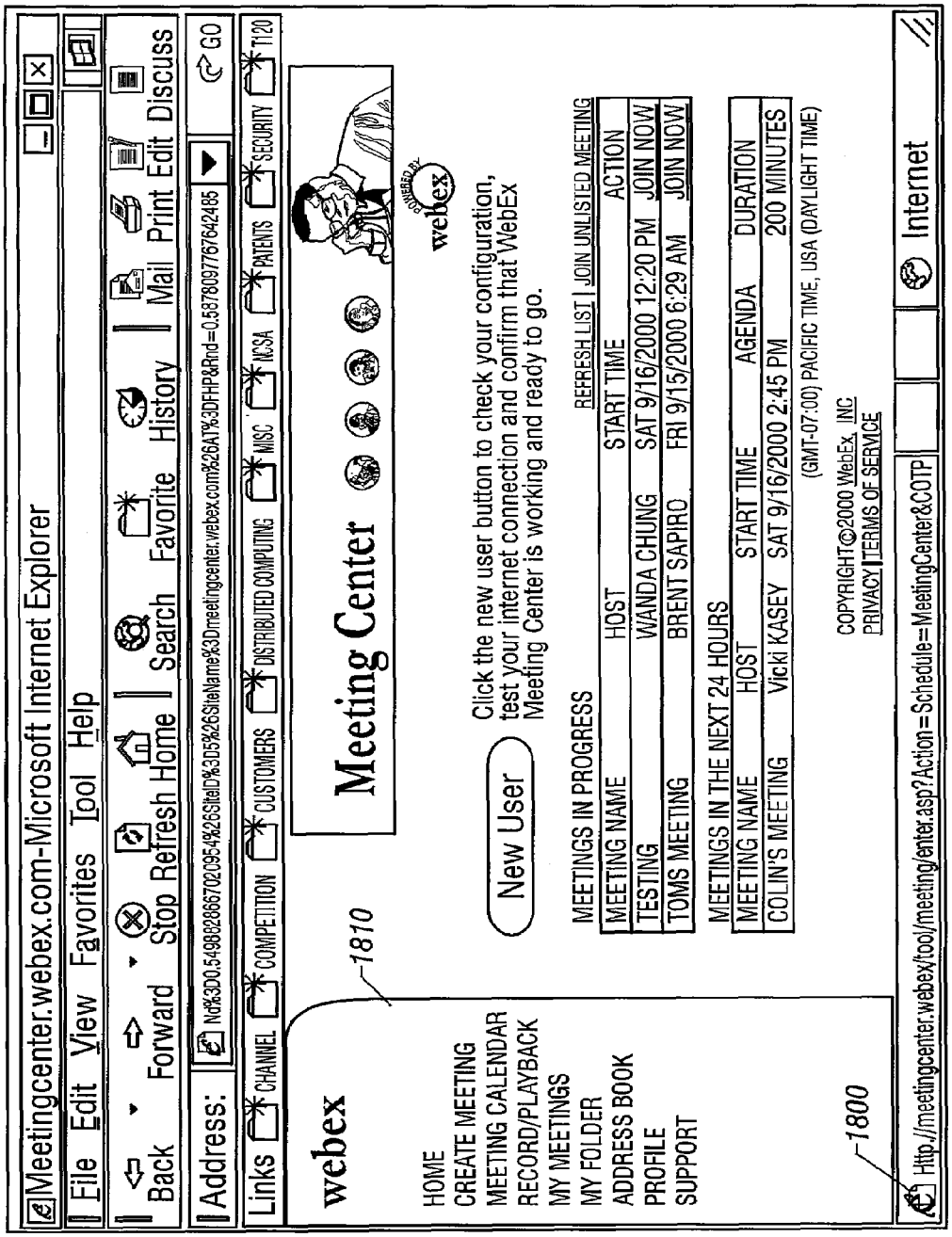
Figure 18B:
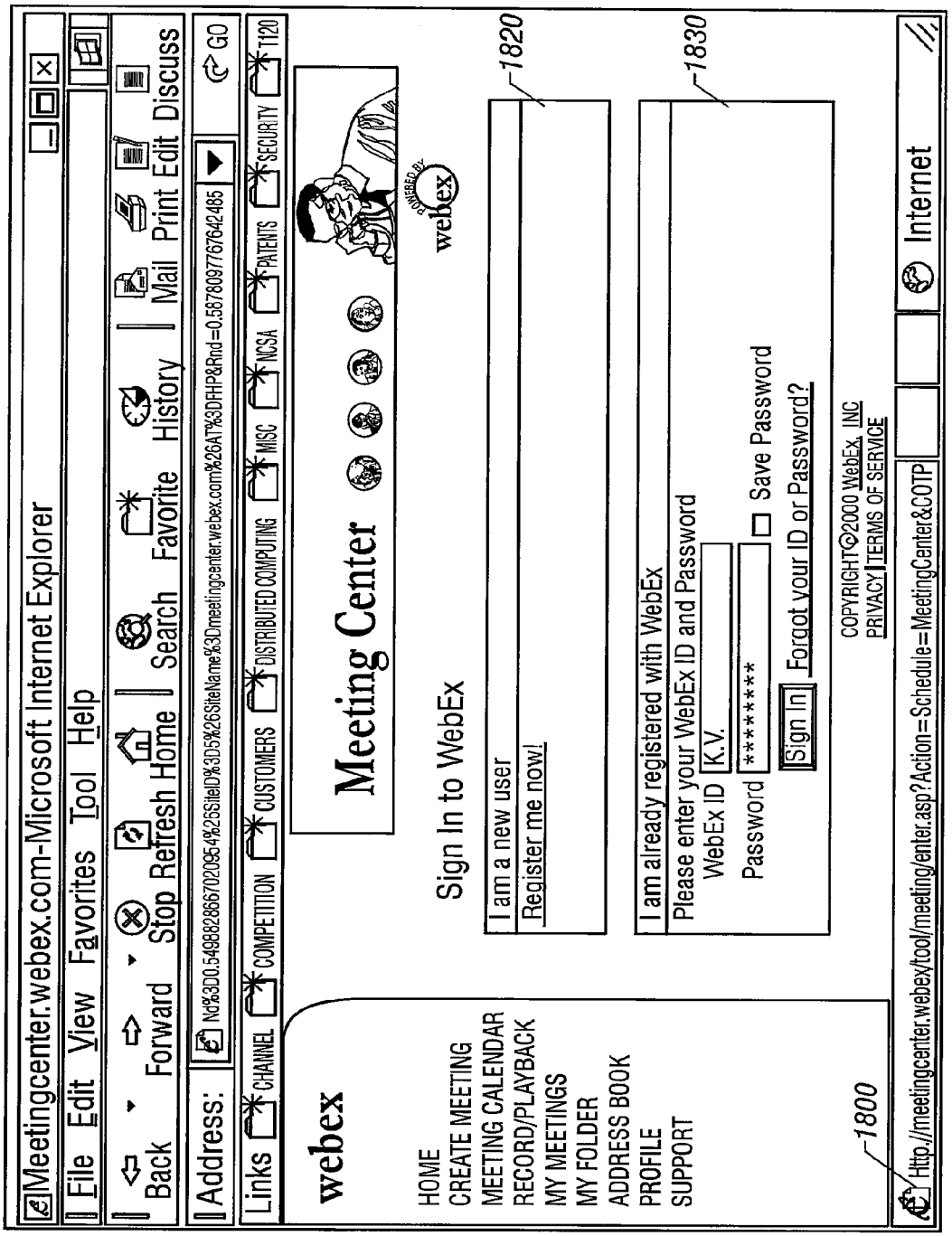
Figure 19A:
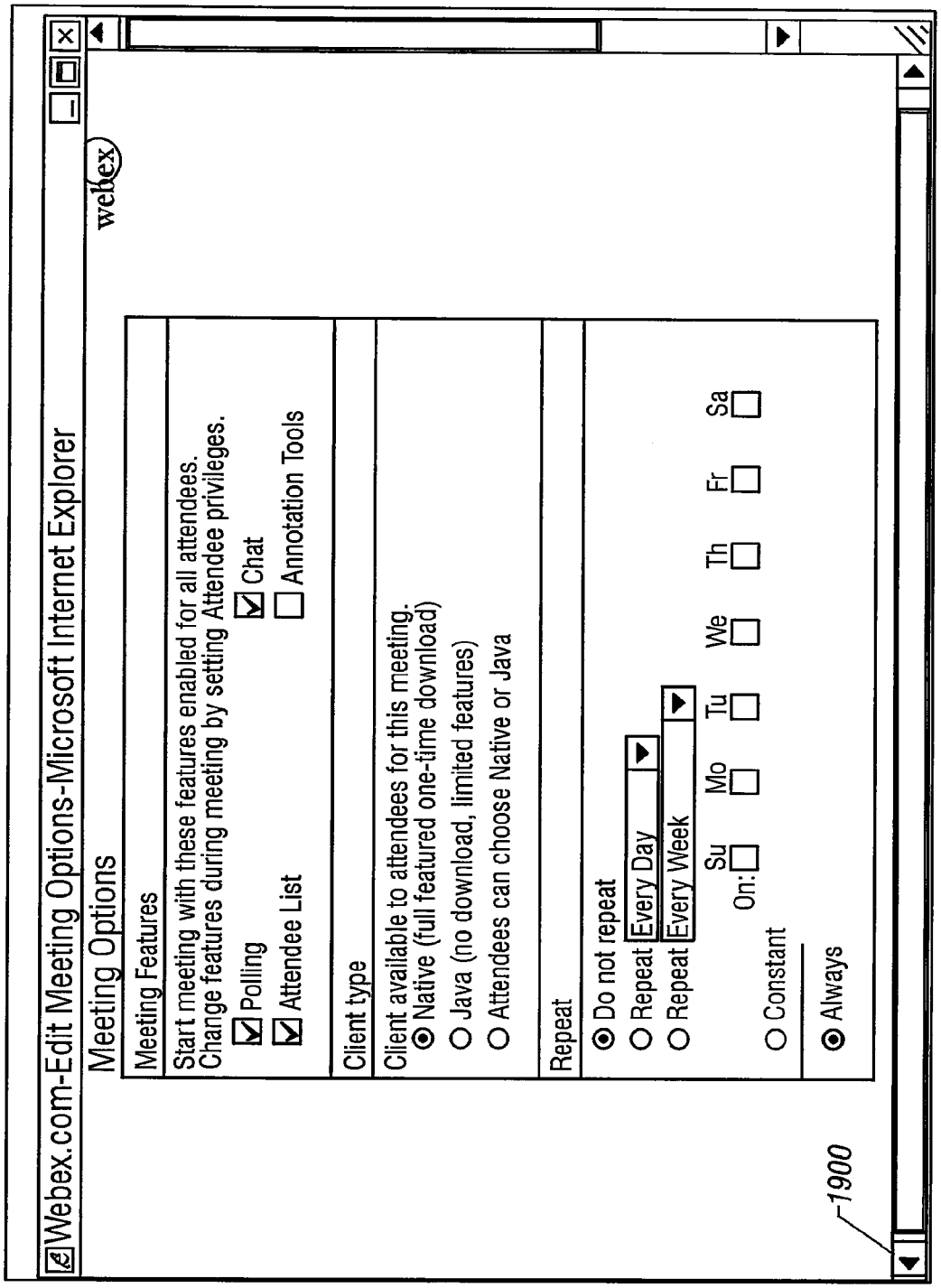
Figure 19B:
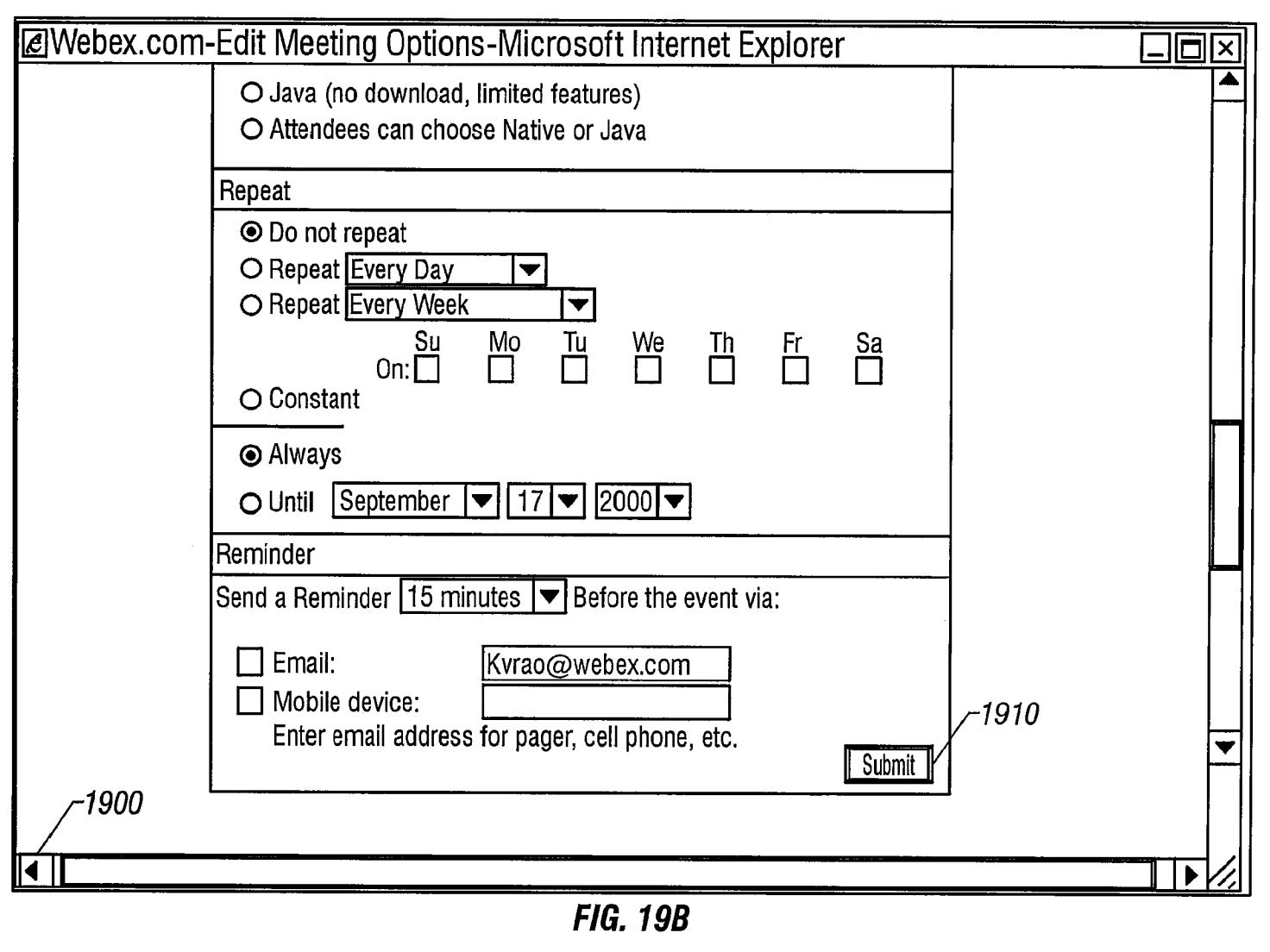

Meeting center web page 1800 (FIGS. 18A, 18B and 18C1-3) is displayed when a user first accesses web server 335 (FIG. 3) through client browser 320. Meeting center web page 1800 contains a list of current and scheduled meetings the user may want to join. In addition, the user may create a new meeting by selecting create meeting button 1810, causing a sign in prompt to be displayed in meeting center web page 1800 (FIG. 18B). If the user is not already registered with the service, the user can register by selecting new user link 1820. Otherwise, the user can enter ID and password information in login prompt 1830. If the user's data is successfully authenticated with the information stored in web database 337 and/or central operation database 340 (FIG. 3), a create new meeting prompt 1840 is displayed in meeting center web page 1800 (FIGS. 18C1-3). The user can then enter meeting parameters such as date, time, and attendee list by filling in new meeting prompt 1840. The user can also edit meeting options by selecting edit options button 1850, thereby causing meeting options web page 1900 (FIGS. 19A-19B) to be displayed. Once the user has entered the desired meeting information on meeting center web page 1800, the user can either schedule the meeting by pressing schedule button 1860 or start the meeting by pressing start now button 1870.

Meeting options web page 1900 allows the user to set specific meeting options such as features, client type, frequency and reminders. Once the user is satisfied with the selected options, the user can return to meeting center web page 1800 by pressing submit button 1910.

Figure 20A:
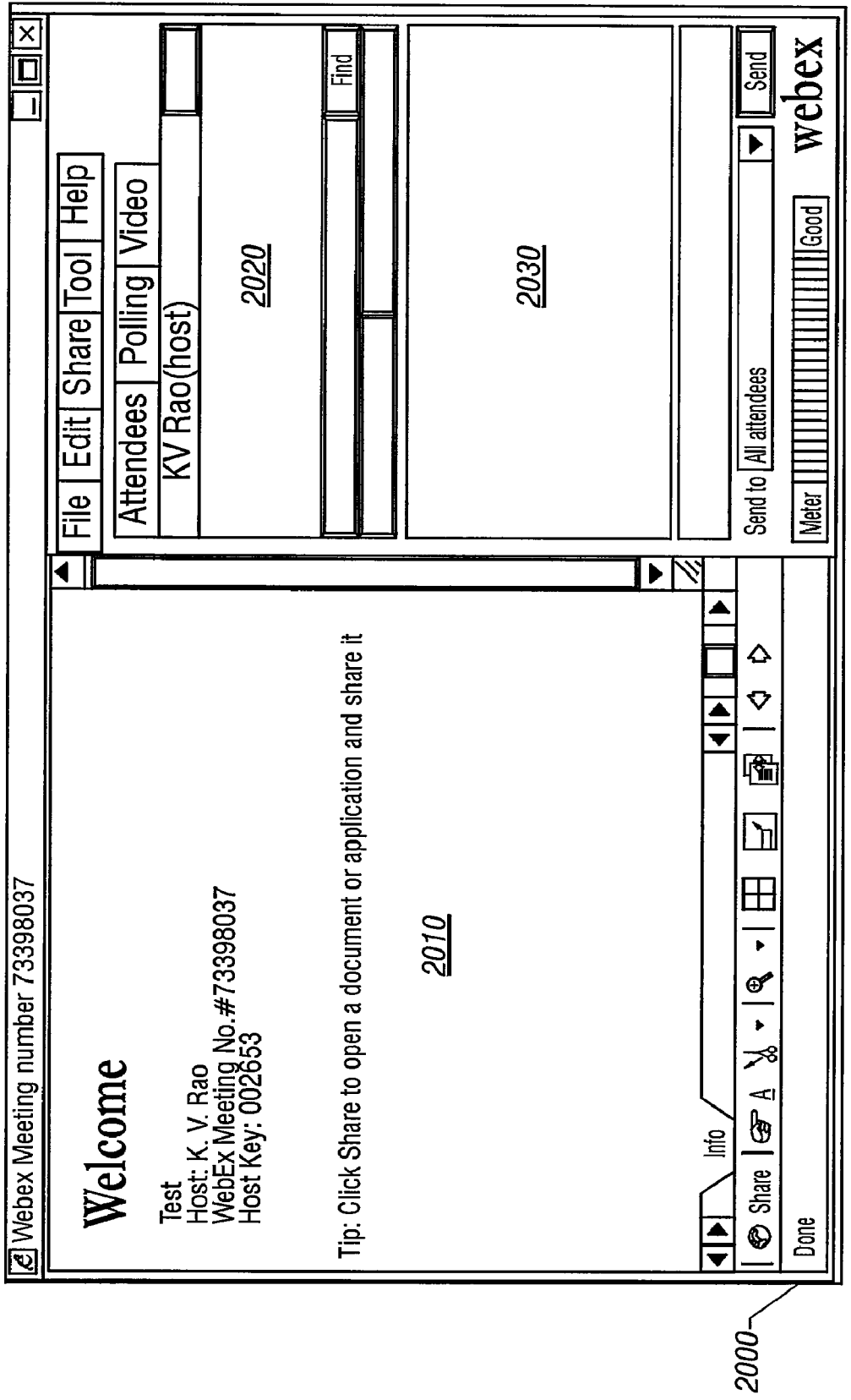
Figure 20B:
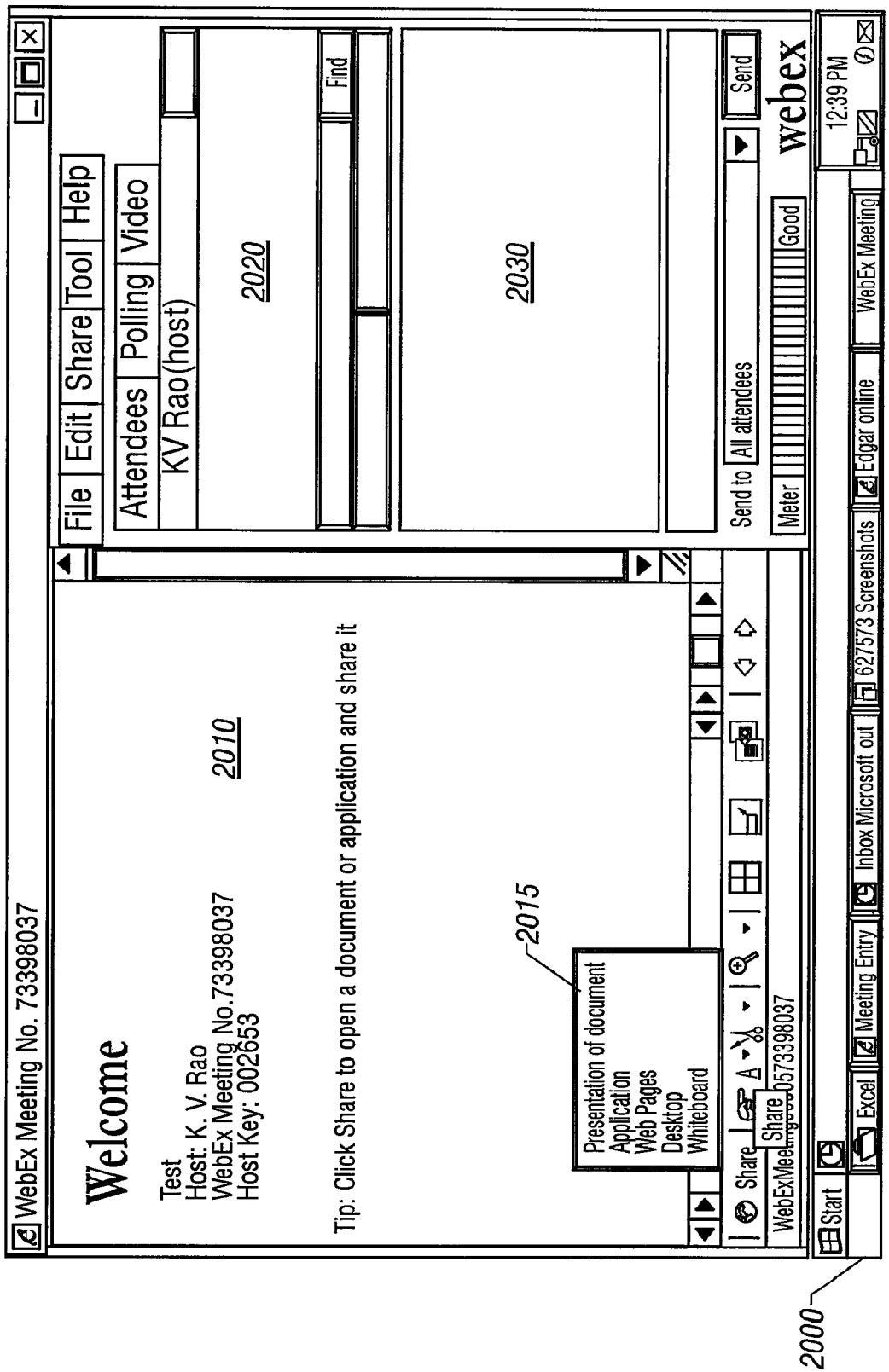
Figure 20C:
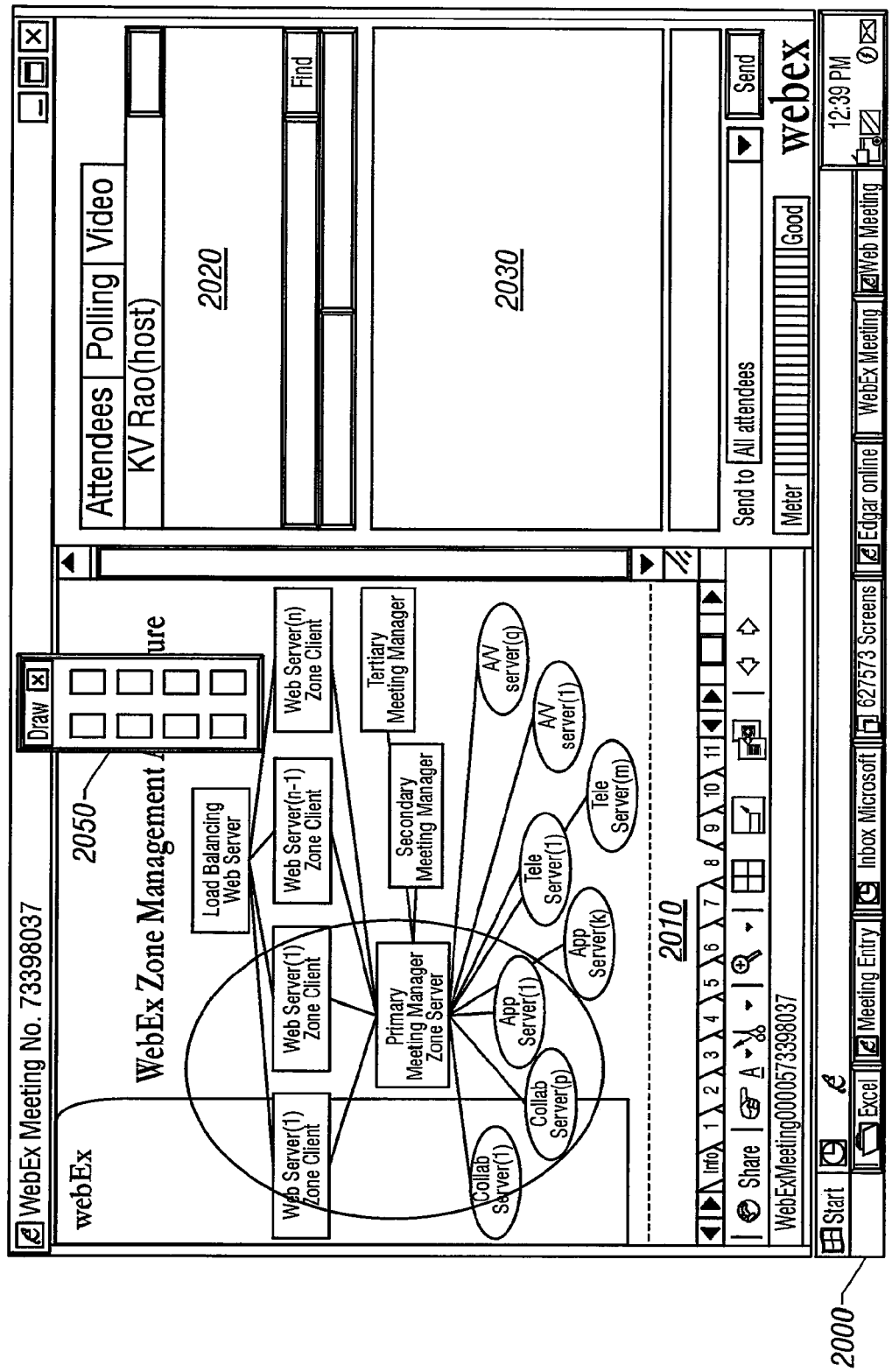

Meeting web page 2000 (FIGS. 20A-20C) is displayed to the user during a meeting. Meeting web page 2000 includes a shared pane 2010, an attendee pane 2020 and a message pane 2030. Information shared among meeting participants are displayed in shared pane 2010. The user can share images, documents, applications, web pages, desktops and whiteboards by selecting an appropriate entry from tools menu 2040 (FIG. 20B). For example, if the user selects to share an image to be marked up by the meeting participants, the image is displayed in shared pane 2010 (FIG. 20C). One or more users can then mark up the image by selecting a drawing tool from drawing menu 2050 and drawing over the image. Attendee pane 2020 contains a list of meeting attendees. Alternatively, attendee pane 2020 can used to display polls taken among the meeting attendees or a video conferencing images. Finally, message pane 2030 can used to compose, send and receive messages among two or more meeting attendees.

Since conference information is replicated across all CB servers 380$n$ handling the conference and can be reconstructed by meeting manager 350, failure of one or more CB servers 380$n$ does not disrupt the conference and can be gracefully recovered. As a result, the distributed collaborative computing system of the present invention eliminates the single point of failure limitation of prior art collaborative computing systems. In addition, since multiple server computers 220$n$ are used to handle an on-line conference, the distributed collaborative computing system of the present invention may handle conferences with an arbitrary number of participants, without any limitations imposed by the processing capacity of any single server computer. By contrast, prior art systems were limited to conferences whose participants could all be handled by a single server computer.

ALTERNATE EMBODIMENTS

The order in which the steps of the present method are performed is purely illustrative in nature. In fact, the steps can be performed in any order or in parallel, unless otherwise indicated by the present disclosure.

The method of the present invention may be performed in either hardware, software, or any combination thereof, as those terms are currently known in the art. In particular, the present method may be carried out by software, firmware, or microcode operating on a computer or computers of any type. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among computers connected to the Internet. Accordingly, the present invention is not limited to any particular platform, unless specifically stated otherwise in the present disclosure.

While particular embodiments of the present invention have been shown and described, it will be apparent to those skilled in the art that changes and modifications may be made without departing from this invention in its broader aspect and, therefore, the appended claims are to encompass within their scope all such changes and modifications as fall within the true spirit of this invention.

APPENDIX A

Volume in drive D is 001227_0945
Volume Serial Number is F65F-BB64

| Directory of D:\ | | | | |
|---|---|---|---|---|
| Dec. 27, 2000 | 09:46a | <DIR> | | |
| Dec. 27, 2000 | 09:46a | <DIR> | | |
| Dec. 18, 2000 | 05:46p | | 25,012 | ATPROC~1.CPP |
| Dec. 18, 2000 | 05:46p | | 3,230 | ATPROC~1.H |
| Dec. 18, 2000 | 05:46p | | 9,645 | PMSPACKT.H |
| Dec. 18, 2000 | 05:46p | | 9,312 | PSPACKT.H |
| | 6 File(s) | | 47,199 | bytes |
| | | | 0 | bytes free |

What is claimed is:

1. A method comprising:

launching a plurality of logical collaboration servers on one or more physical servers, wherein each collaboration server is operable to host at least a portion of an on-line conference among a plurality of client computers;

storing state information for each of the plurality of collaboration servers at a gatekeeper that is separate from the collaboration servers, the state information for each collaboration server including current meeting data for the at least a portion of an on-line conference hosted at the collaboration server;

detecting a failure of a collaboration server;

in response to detecting the failure, launching a new collaboration server; and recovering the state information for the failed collaboration server from the gatekeeper to the new collaboration server.

2. The method of claim 1, wherein the gatekeeper is a meeting manager that manages the plurality of collaboration servers.

3. The method of claim 1, wherein the launching a plurality of collaboration servers is performed by one or more process managers.

4. The method of claim 1, further comprising:

associating at least one logical application server with each collaboration server, the at least one application server to support at least one service for the on-line conference.

5. The method of claim 4, wherein the at least one service is selected from the group consisting of: document viewing, file sharing, video, voice over IP, telephony, polling, chat, and application sharing.

6. The method of claim 4, further comprising:

detecting a failure of an application server;

suspending operation of the collaboration server associated with the failed application server;

launching a new application server; and resuming operation of the collaboration server associated with the failed application server.

7. The method of claim 1, wherein the detecting a failure of the collaboration server is performed by a meeting manager that manages the plurality of collaboration servers.

8. The method of claim 1, further comprising:

allowing the plurality of collaboration servers to communicate with each other to support the on-line conference.

9. The method of claim 1, wherein the state information for each collaboration server comprises information describing the collaboration server's configuration and quality of service (QoS) parameters.

10. An apparatus comprising:

one or more server computers; and computer instructions stored in a computer-readable medium, the computer instructions when executed by the one or more server computers operable to, launch a plurality of logical collaboration servers on the one or more server computers, wherein each collaboration server is operable to host at least a portion of an on-line conference among a plurality of client computers, store state information for each of the plurality of collaboration servers at a gatekeeper that is separate from the collaboration servers, the state information for each collaboration server including current meeting data for the at least a portion of an on-line conference hosted at the collaboration server, detect a failure of a collaboration server, launch a new collaboration server in response to detection of the failure, and recover the state information for the failed collaboration server from the gatekeeper to the new collaboration server.

11. The apparatus of claim 10 wherein the computer instructions when executed by the one or more server computers are further operable to, associate at least one logical application server with each collaboration server, the at least one application server to support at least one service for the on-line conference.

12. The apparatus of claim 11 wherein the computer instructions when executed by the one or more server computers are further operable to, detect a failure of an application server, suspend operation of the collaboration server associated with the failed application server, launch a new application server, and resume operation of the collaboration server associated with the failed application server.

13. The apparatus of claim 11 wherein the state information for each collaboration server comprises information describing the collaboration server's configuration and quality of service (QoS) parameters.

14. A system comprising:

one or more physical servers accessible to a plurality of client computers via a wide area network to provide the plurality of client computers collaborative computing, the one or more physical servers including, a means for launching a plurality of collaborative servers, wherein each collaborative server is operable to host at least a portion of an on-line conference among the plurality of client computers, a means that is separate from the collaborative servers for storing state information for each of the plurality of collaborative servers, the state information for each collaborative server including current meeting data for the at least a portion of an on-line conference hosted at the collaborative server, a means to support at least one service for the on-line conference; and a means for detecting failures of the collaborative servers and upon detecting failure of one of the collaborative servers, to send a request to the means for launching a plurality of collaborative servers to launch a new collaborative server, wherein the new collaborative server is configured to recover the state information for the failed collaborative server from the means for storing state information.

15. The system of claim 14, wherein the means for launching a plurality of collaborative servers includes one or more process managers.

16. The system of claim 14, wherein the means to support at least one service for the on-line conference includes one or more application servers.

17. The system of claim 16 wherein the means for launching a plurality of collaborative servers is further configured to launch a plurality of the application servers.

18. The system of claim 17 wherein upon detecting failure of one of the application servers, the meeting manager reconnects collaborative servers connected to the failed application server to the new application server.

19. The system of claim 14, wherein the means for detecting failures of the collaborative servers includes one or more meeting managers.

20. The system of claim 14, wherein the one or more physical servers further include one or more web servers accessible to the plurality of client computers via the wide area network.

21. The system of claim 14, further comprising a means for allowing the plurality of collaborative servers to communicate with each other.

22. The system of claim 14, wherein the at least one service for the on-line conference comprises one of document viewing, file sharing, video, voice over IP, telephony, polling, chat, and application sharing.

23. The system of claim 14, wherein the state information for each collaborative server further comprises information describing the collaborative server's configuration and quality of service (QoS) parameters.

* * * * *

UNITED STATES PATENT AND TRADEMARK OFFICE
CERTIFICATE OF CORRECTION

PATENT NO.         : 7,523,163 B2
APPLICATION NO. : 11/480659
DATED              : April 21, 2009
INVENTOR(S)        : Min Zhu It is certified that error appears in the above-identified patent and that said Letters Patent is hereby corrected as shown below:

Col. 13, Line 16, should read as follows:

CB server $380n$ is detected, client browser 320 attempts <u>to reconnect to a new CB server $380n$ (stage 1740) and stages 1710-1730 are repeated.</u> Oth- Signed and Sealed this Twenty-first Day of September, 2010

David J. Kappos
*Director of the United States Patent and Trademark Office*